United States Patent [19]

Saotome et al.

[11] Patent Number: 4,943,724
[45] Date of Patent: Jul. 24, 1990

[54] RADIATION IMAGE RECORDING AND READ-OUT APPARATUS

[75] Inventors: Shigeru Saotome; Masamitsu Ishida, both of Kanagawa, Japan

[73] Assignee: Fuji Photo Film Co., Ltd., Kanagawa, Japan

[21] Appl. No.: 182,678

[22] Filed: Apr. 18, 1988

[30] Foreign Application Priority Data

Apr. 17, 1987 [JP] Japan ................................. 62-94546
Apr. 17, 1987 [JP] Japan ................................. 62-94549

[51] Int. Cl.⁵ ............................................ G01N 23/04
[52] U.S. Cl. .................................. 250/327.2; 378/190
[58] Field of Search ........................... 250/327.2, 484.1; 378/172, 189, 190

[56] References Cited

U.S. PATENT DOCUMENTS 4,820,922  4/1989  Nakajima ........................... 250/327.2
4,835,386  5/1989  Shimura et al. ............... 250/484.1 B

FOREIGN PATENT DOCUMENTS 0077676  10/1982  European Pat. Off. .
0077678  10/1982  European Pat. Off. .
   84738   8/1983  European Pat. Off. ............. 378/190
0179411  10/1985  European Pat. Off. .
0220629  10/1986  European Pat. Off. .
   95531   5/1985  Japan ................................. 378/172

OTHER PUBLICATIONS

European Search Report, EP 88106155.
Patent Abstracts of Japan, vol. 8, No. 58 (P-261) [1495], Mar. 16, 1984 & JP-A-58 207 038 (Hitachi Seisakusho K.K.) 02-12-1983.

Primary Examiner—Carolyn E. Fields
Attorney, Agent, or Firm—Sughrue, Mion, Zinn, Macpeak & Seas

[57] ABSTRACT

A radiation image recording and read-out apparatus comprises a recording and read-out unit provided with a case having a size nearly equal to a single image recording area on a stimulable phosphor sheet, an image recording section for recording a radiation image of an object on the stimulable phosphor sheet, an image read-out section provided in the case for reading the radiation image from the stimulable phosphor sheet, and an erasing section provided in the case. The recording and read-out unit is moved between a first position at which the stimulable phosphor sheet is disposed at an image recording position exposed to radiation passing through the object, and a second position retracted from the first position. A fluoroscopic device is provided for receiving the radiation passing through the object at the time the recording and read-out unit is present at its second position, and converting the radiation into signals for a visible image.

5 Claims, 15 Drawing Sheets

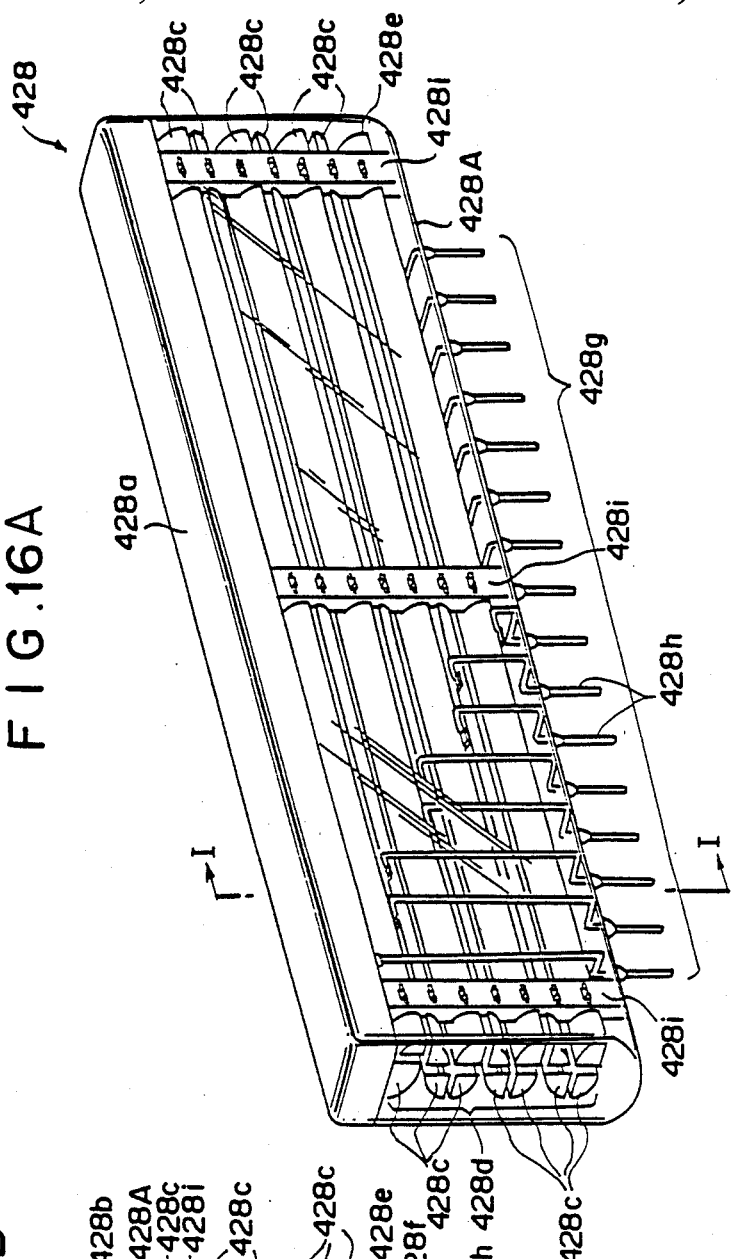
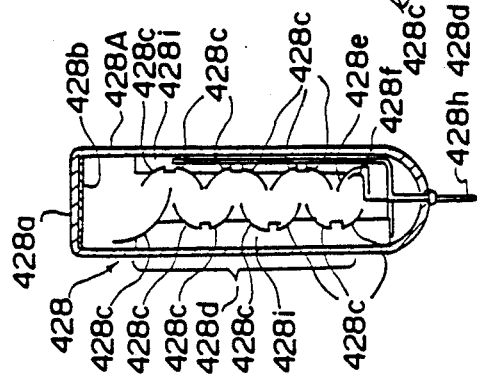

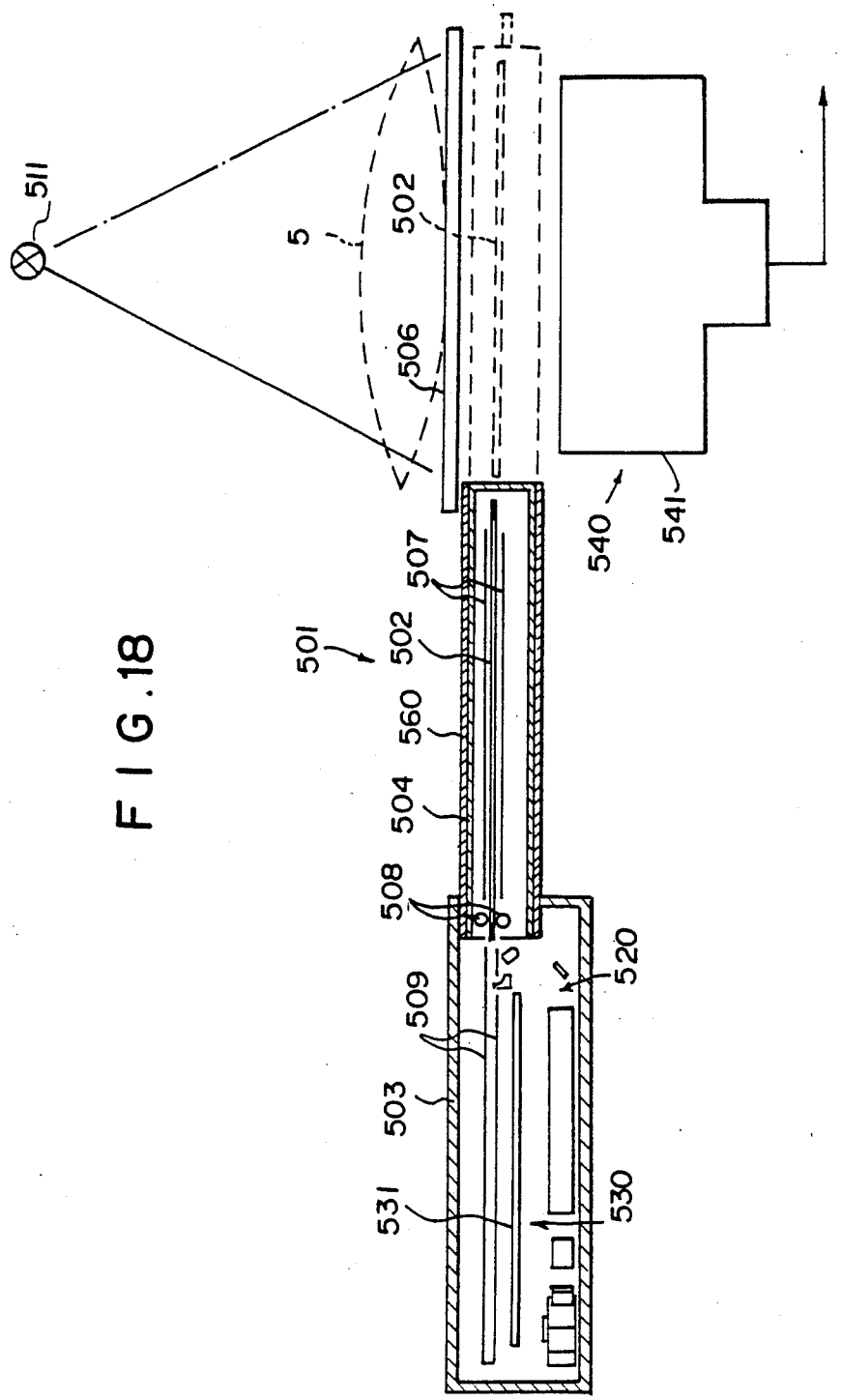

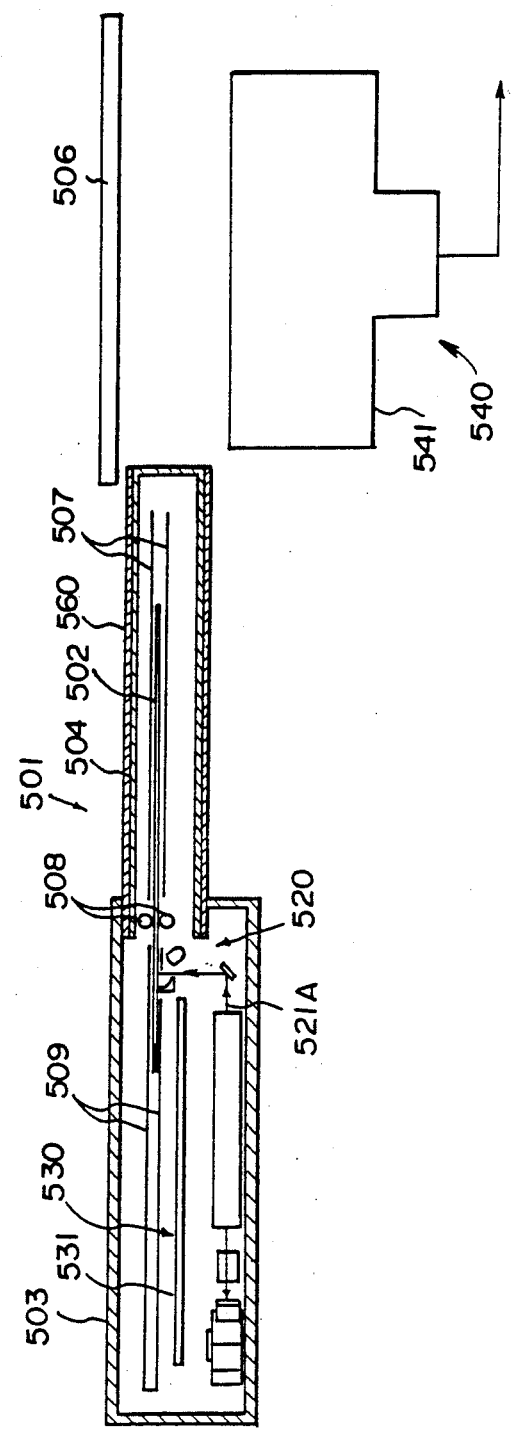

RADIATION IMAGE RECORDING AND READ-OUT APPARATUS

BACKGROUND OF THE INVENTION

1. Field of the Invention

This invention relates to a radiation image recording and read-out apparatus for recording a radiation image on a stimulable phosphor, exposing the stimulable phosphor to stimulating rays which cause the stimulable phosphor to emit light in proportion to the stored radiation energy, detecting the emitted light to read out the radiation image, and converting the emitted light into electric signals. This invention particularly relates to a radiation image recording and read-out apparatus which enables fluoroscopic monitoring of a radiation image prior to the recording thereof.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then scanned with stimulating rays which cause it to emit light in proportion to the stored radiation energy. The light emitted by the stimulable phosphor sheet upon stimulation thereof is photoelectrically detected and converted to electric image signals, which are processed as desired to reproduce a visible image having an improved image quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom on a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for carrying out the aforesaid radiation image recording and reproducing method and moves from place to place to record radiation images for mass medical examinations, it is disadvantageous to load the mobile X-ray diagnostic station with a large number of stimulable phosphor sheets, and the number of the stimulable phosphor sheets which can be loaded on the mobile X-ray diagnostic station is limited. Therefore, it is desired to load the mobile X-ray diagnostic station with stimulable phosphor sheets which can be used repeatedly, store the radiation images of the objects respectively on the stimulable phosphor sheets, transfer the electric image signals read out from the stimulable phosphor sheets to a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examination. This is very advantageous in practical use.

In order to reuse stimulable phosphor sheets as mentioned above, the radiation energy remaining on the stimulable phosphor sheet after it is scanned with stimulating rays to read out the radiation image stored thereon should be erased by exposing the stimulable phosphor sheet to light or heat as described in, for example, U.S. Pat. No. 4,400,619 or Japanese Unexamined Patent Publication No. 56(1981)-12599. The stimulable phosphor sheet should then be used again for radiation image recording.

From the aforesaid viewpoint, the applicant proposed in Japanese Unexamined Patent Publication No. 59(1984)-192240 a radiation image recording and read-out apparatus comprising:

(i) a circulation and conveyance means for conveying at least one stimulable phosphor sheet for recording a radiation image thereon along a predetermined circulation path, (ii) an image recording section disposed on the circulation path for recording a radiation image of an object on the stimulable phosphor sheet by exposing the stimulable phosphor sheet to a radiation passing through the object, (iii) an image read-out section disposed on the circulation path and provided with a stimulating ray source for emitting stimulating rays for scanning the stimulable phosphor sheet carrying the radiation image stored thereon at the image recording section, and a photoelectric read-out means for detecting light emitted by the stimulable phosphor sheet scanned with the stimulating rays to obtain electric image signals, and (iv) an erasing section disposed on the circulation path for, prior to the next image recording on the stimulable phosphor sheet for which the image read-out has been carried out at the image read-out section, having the stimulable phosphor sheet release the radiation energy remaining on the stimulable phosphor sheet, whereby the stimulable phosphor sheet is circulated through the image recording section, the image read-out section and the erasing section, and reused for radiation image recording. With the radiation image recording and read-out apparatus having such a configuration, the radiation image recording and read-out can be carried out sequentially and efficiently.

The applicant also proposed, in Japanese Unexamined Patent Publication No. 61(1986)-99139, a radiation image recording and read-out apparatus provided with a fluoroscopic means at a position capable of facing a radiation source via an object for receiving the radiation passing through the object and converting it into signals for a visible image so that desired image recording is carried out at good timing of image recording at the aforesaid image recording section without the image recording timing being adjusted by relying on experience and intuition of the operator. With the proposed radiation image recording and read-out apparatus, fluoroscopy of the image can be carried out by use of the fluoroscopic means prior to conveyance of a stimulable phosphor sheet to the image recording position, and the stimulable phosphor sheet can be sent at appropriate timing to the image recording position, thereby to carry out the image recording at good timing.

However, the proposed radiation image recording and read-out apparatus becomes comparatively large because of the provision of the circulation path for the stimulable phosphor sheet in the apparatus. Therefore, with the conventional radiation image recording and read-out apparatus, it is only possible that the apparatus be installed and used in the mobile X-ray diagnostic station such as a traveling X-ray diagnostic station in the form of a vehicle like a bus, or at the center of a comparatively large-scale hospital. It is not always possible to install and use the conventional radiation image recording and read-out apparatus in each medical examination room of a comparatively small-scale hospital, and thus the range of utilization of the apparatus is limited.

SUMMARY OF THE INVENTION

The primary object of the present invention is to provide a radiation image recording and read-out apparatus which is provided with a fluoroscopic means and is made small by simplification of the apparatus configuration and in which a stimulable phosphor sheet is used repeatedly.

Another object of the present invention is to provide a radiation image recording and read-out apparatus which is light and small and in which the timing of radiation image recording is adjusted easily and accurately.

In the radiation image recording and read-out apparatus in accordance with the present invention, instead of conveying a stimulable phosphor sheet sequentially to an image recording section, an image read-out section and an erasing section along a circulation and conveyance path, a small recording and read-out unit containing a stimulable phosphor sheet and provided with the image recording, read-out and erasing functions is provided.

Specifically, the present invention provides a first radiation image recording and read-out apparatus which comprises:

(i) a recording and read-out unit provided with:
 (a) a case for housing therein a stimulable phosphor sheet and having longitudinal and transverse dimensions approximately equal to the longitudinal and transverse dimensions of a single image recording area on said stimulable phosphor sheet,
 (b) an image recording section for holding said stimulable phosphor sheet in said case, and having a radiation image of an object stored on said stimulable phosphor sheet,
 (c) an image read-out section provided in said case for exposing said stimulable phosphor sheet carrying said radiation image stored thereon to stimulating rays which cause said stimulable phosphor sheet to emit light in proportion to the stored radiation energy, and photoelectrically detecting the emitted light to obtain image signals, and
 (d) an erasing section provided in said case for releasing the radiation energy remaining on said stimulable phosphor sheet, for which the detection of said emitted light has been carried out, before the image recording is carried out on said stimulable phosphor sheet, (ii) a unit movement means for moving said recording and read-out unit so that said recording and read-out unit takes a first position at which said stimulable phosphor sheet held at said image recording section is disposed at an image recording position exposed to radiation passing through said object, and a second position retracted from said first position, and (iii) a fluoroscopic means for receiving the radiation passing through said object at the time said recording and read-out unit is present at said second position, and converting the radiation into signals for a visible image.

The present invention also provides a second radiation image recording and read-out apparatus which comprises:

(i) a recording and read-out unit provided with:
 (a) a case capable of housing a stimulable phosphor sheet therein, having longitudinal and transverse dimensions approximately equal to the longitudinal and transverse dimensions of a single image area on said stimulable phosphor sheet, and provided at one case end with an opening through which a light shielding cover is to be passed,
 (b) the light shielding cover housed in said case for projection out of said case through said opening for passage of the light shielding cover, and holding said stimulable phosphor sheet in said light shielding cover at the position thereof projected out of said case to have said stimulable phosphor sheet exposed to radiation passing through an object, said light shielding cover being provided with a sheet passage opening at an end on the side supported by said case at the time said light shielding cover is projected out of said case,
 (c) an image read-out section provided in said case for exposing said stimulable phosphor sheet carrying said radiation image stored thereon to stimulating rays which cause said stimulable phosphor sheet to emit light in proportion to the stored radiation energy, and photoelectrically detecting the emitted light to obtain image signals, and
 (d) an erasing section provided in said case for releasing the radiation energy remaining on said stimulable phosphor sheet, for which the detection of said emitted light has been carried out, before the image recording is carried out on said stimulable phosphor sheet, and (ii) a fluoroscopic means for receiving the radiation passing through said object before said light shielding cover is disposed at the position thereof projected out of said case, and converting the radiation into signals for a visible image.

The fluoroscopic means may be secured at the position that is exposed to the radiation passing through the object, or may be formed moveably to receive the radiation at least at the time fluoroscopy is to be carried out.

With the first radiation image recording and read-out apparatus in accordance with the present invention wherein the recording and read-out unit comprising the case having the longitudinal and transverse dimensions approximately equal to the single radiation image recording area, and the image recording section, the image read-out section and the erasing section housed in the case is used, the apparatus can be made markedly smaller and lighter than the conventional radiation image recording and read-out apparatus wherein the stimulable phosphor sheet is circulated and conveyed. Also, the recording and read-out unit which is light and small can be moved easily, and monitoring of the radiation image by use of the fluoroscopic means can be carried out prior to the image recording by the movement of the recording and read-out unit. Therefore, the timing of the image recording can be adjusted easily and accurately without relying on experience and intuition of the operator.

With the second radiation image recording and read-out apparatus in accordance with the present invention, the recording and read-out unit comprising the case having the longitudinal and transverse dimensions approximately equal to the single radiation image recording area, and the image recording section, the image read-out section and the erasing section housed in the case, as well as the light shielding cover projectable to the image recording position out of the case at the time of image recording is used. Therefore, the conveyance system for the stimulable phosphor sheet can be simplified linearly, and the apparatus can be made markedly smaller and lighter than the conventional radiation image recording and read-out apparatus wherein the stimulable phosphor sheet is circulated and conveyed. Also, the light shielding cover can be moved easily between the position inside of the case and the position outside of the case, and monitoring of the radiation image by use of the fluoroscopic means can be carried out prior to the image recording by the movement of the light shielding cover. Therefore, the timing of the image recording can be adjusted easily and accurately without relying on experience and intuition of the operator.

BRIEF DESCRIPTION OF THE DRAWINGS

FIG. 16A is a perspective view showing the photomultiplier employed in the embodiment shown in FIGS. 12, 13 and 14, FIG. 16B is a sectional view taken along line I—I in FIG. 16A.

DESCRIPTION OF THE PREFERRED EMBODIMENTS

The present invention will hereinbelow be described in further detail with reference to the accompanying drawings.

Figure 1:
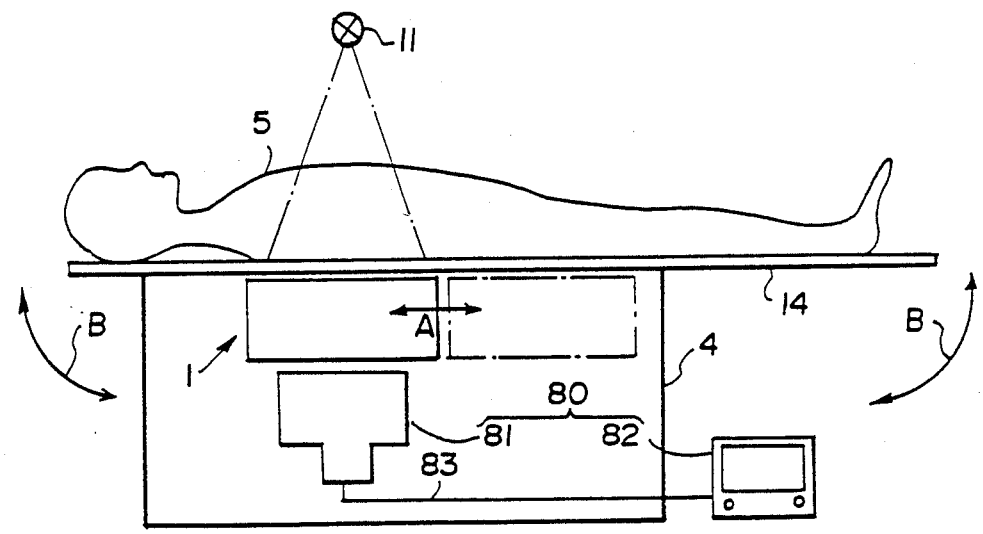
FIG. 1 is a schematic side view showing an embodiment of the first radiation image recording and readout apparatus in accordance with the present invention.
Figure 2:
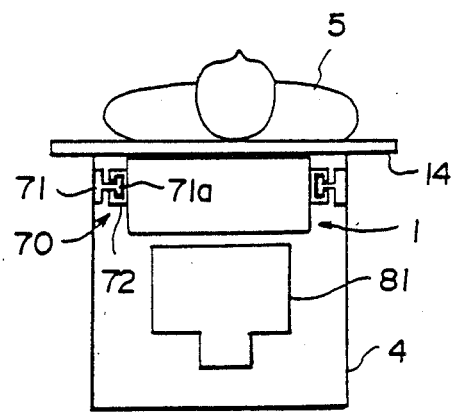
FIG. 2 is an elevational view showing the embodiment shown in FIG. 1, FIGS. 3 and 4 are a side view and a plan view showing the recording and read-out unit employed in the embodiment shown in FIG. 1, FIGS. 5A and 5B are a partially cutaway perspective view and a sectional side view showing the photomultiplier employed in the embodiment shown in FIG. 1.

With reference to FIGS. 1 and 2, an embodiment of the first radiation image recording and read-out apparatus in accordance with the present invention comprises a recording and read-out unit 1 composed of a case and an image recording section, an image read-out section and an erasing section housed in the case, a unit movement means 70 for moving the recording and read-out unit 1 in the direction as indicated by the arrow A so that the recording and read-out unit 1 takes a first position as indicated by the solid line in FIG. 1, and a second position as indicated by the chain line in FIG. 1, and a fluoroscopic means 80 provided with a fluoroscopic section 81 composed of, for example, an image intensifier tube with a television camera or the like. The upper surface of the apparatus constitutes a radiation-permeable image recording table 14, and an object 5 is placed on the image recording table 14 to face a radiation source 11 constituted by an X-ray source or the like and provided above the image recording table 14. By way of example, as shown in FIG. 2, the unit movement means 70 comprises rails 71, 71 secured to the inner side surfaces of an outer case 4 of the apparatus, and engagement portions 72, 72 secured to the side surfaces of the case of the recording and read-out unit 1 for engagement with protrusions 71a, 71a of the rails 71, 71. The recording and read-out unit 1 is moved in the direction as indicated by the arrow A in FIG. 1 along which the rails 71, 71 extend, i.e. at an angle normal to the drawing sheet in FIG. 2, manually or by use of a drive means such as a motor, with the engagement portions 72, 72 engaging with the protrusions 71a, 71a of the rails 71, 71. This embodiment should preferably be provided with a mechanism for tilting the whole apparatus including the radiation source 11 as indicated by the arrow B in FIG. 1. The configuration of the recording and read-out unit 1 will hereinbelow be described with reference to FIGS. 3 and 4.

Figure 3:
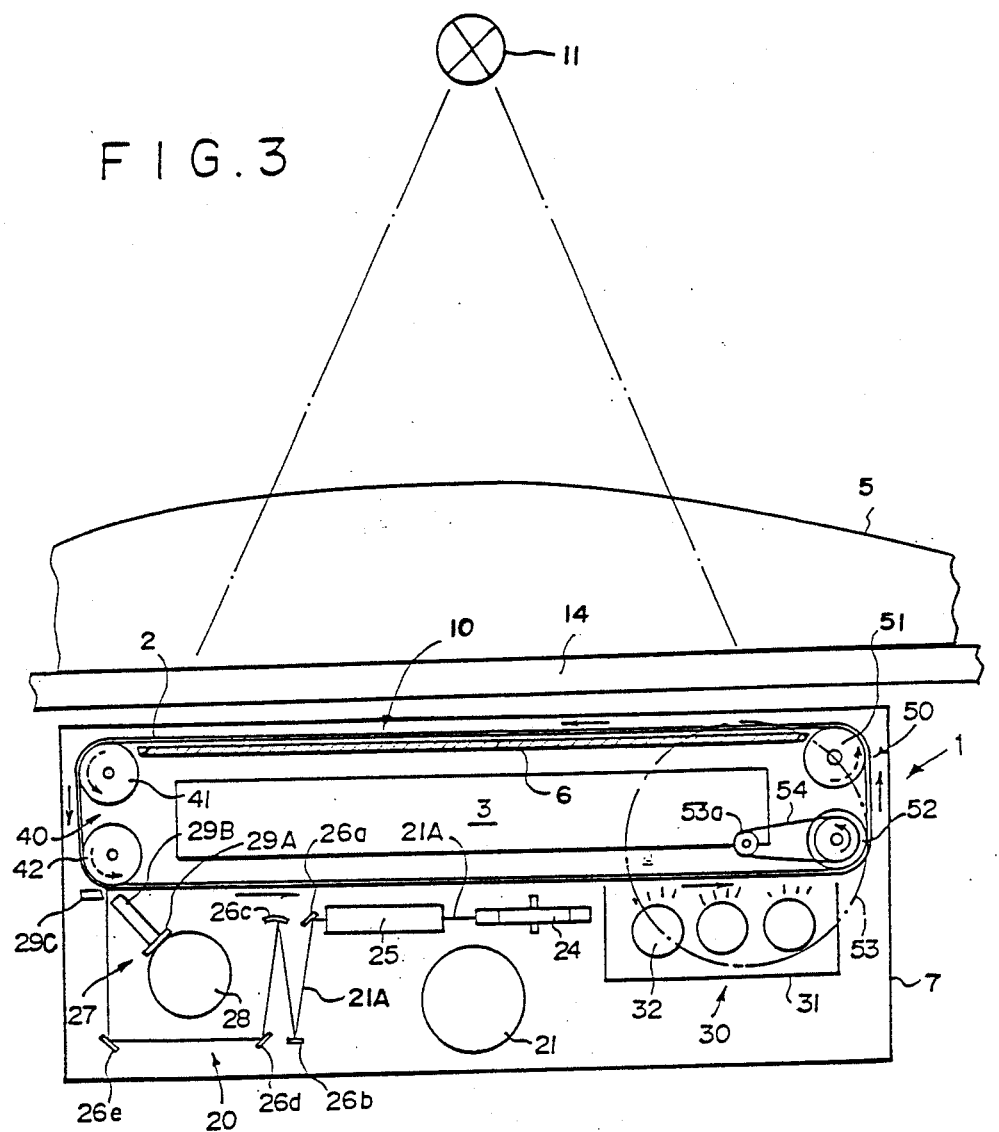

With reference to FIG. 3, in the recording and read-out unit 1, an endless recording belt 2 composed of an endless belt on which a stimulable phosphor layer is formed over the overall surface to constitute a stimulable phosphor sheet is housed in a case 7, and is applied around a first roller section 40 constituted by rollers 41 and 42, and a second roller section 50 constituted by rollers 51 and 52 and spaced by a predetermined distance from the first roller section 40. The recording belt 2 is conveyed and circulated in the direction as indicated by the arrow around the first roller section 40 and the second roller section 50. When the recording and read-out unit 1 is present at its first position, the recording belt 2 in the recording and read-out unit 1 faces the radiation source 11 via the object 5. In this embodiment, an image recording section 10 is set at the part at which the recording belt 2 is held at the position exposed to radiation, i.e. between the rollers 41 and 51, with the recording and read-out unit 1 being disposed at its first position.

When the radiation source 11 is activated to irradiate the radiation to the object 5 placed on the image recording table 14, an image of the radiation passing through the object 5 is projected onto the recording belt 1. In this manner, the radiation image of the object 5 is stored on the stimulable phosphor layer of the recording belt 2. Also, the distance between the first roller section 40 and the second roller section 50 is adjusted to be approximately equal to the length of a single image formed by the image recording. Therefore, the aforesaid radiation image is stored over the overall area of the upper side region of the recording belt 2 in FIG. 3 by a single image recording step.

Figure 4:
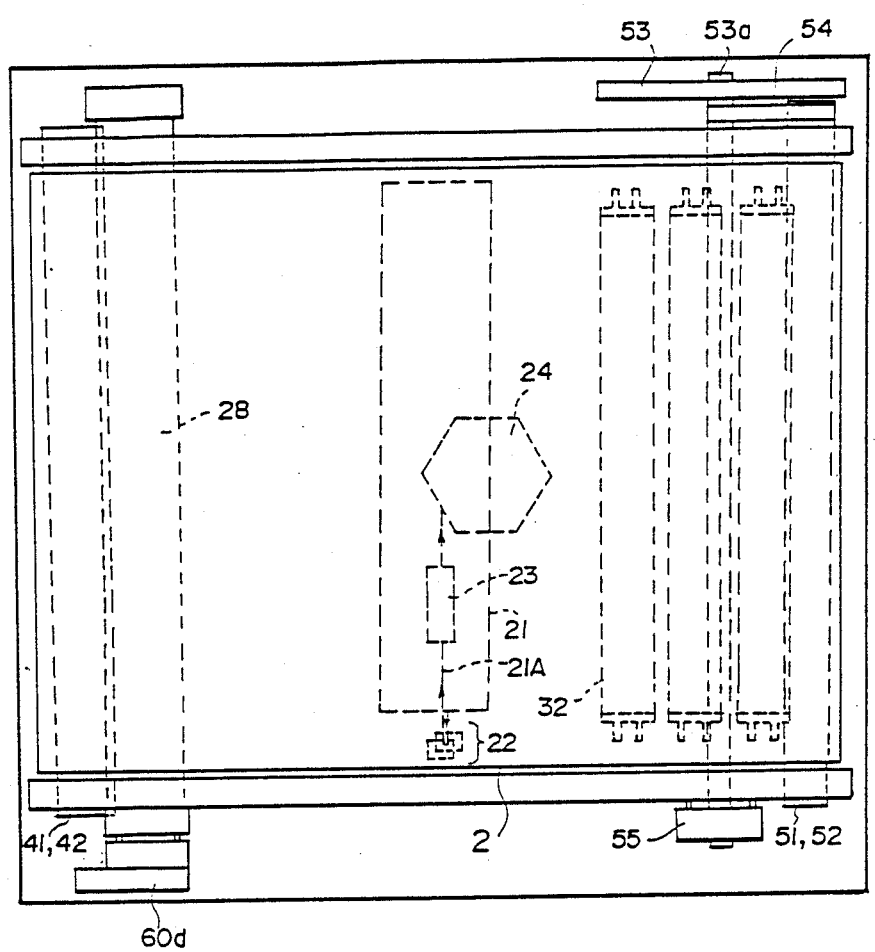

As long as the image recording is being carried out, the recording belt 2 is maintained stationary at a predetermined position so that the portion of the recording belt 2 on which the image recording is carried out faces the radiation source 11. When the image recording is finished, the recording belt 2 is conveyed by rollers 41, 42, 51 and 52 rotated in the directions as indicated by the arrows, and the image-recorded portion of the recording belt 2 is conveyed to an image read-out section 20 disposed on the left side below the recording belt 2 in the case 7. Of the rollers 41, 42, 51 and 52, the roller 52 is a drive roller connected with a shaft 53a of a motor 53 by a belt or a chain, and the other rollers 41, 42 and 51 are driven rollers which rotate by following up the drive roller 52. As shown in FIG. 4, a rotary encoder 55 is secured to the shaft 53a of the motor 53 for detecting the rotation of the motor 53 and carrying out various control items.

At the image read-out section 20, a stimulating ray source 21 constituted by a He-Ne laser or the like for producing stimulating rays 21A extends normal to the direction of conveyance of the recording belt 2. Also, a rotating polygon mirror 24 as a light deflector for scanning the stimulating rays 21A on the recording belt 2 in the width direction of the recording belt 2, i.e. in the main scanning direction at an angle normal to the drawing sheet in FIG. 3, is provided in the optical path of the stimulating rays 21A. As shown in FIG. 4, the optical path of the stimulating rays 21A produced by the stimulating ray source 21 is changed by a mirror group 22, and then the stimulating rays 21A pass through a light input optical system 23 provided with a beam expander, a cylindrical lens or the like, and impinge upon the rotating polygon mirror 24. As shown in FIG. 3, the stimulating rays 21A reflected and deflected by the rotating polygon mirror 24 pass through a scanning optical system 25 composed of an fθ lens or the like, the optical path of the stimulating rays 21A is changed by mirrors 26a, 26b, 26c, 26d and 26e, and then the stimulating rays 21A repeatedly scan the recording belt 2 on the lower circumferential surface of the roller 42 in the main scanning direction. The mirror 26c is a cylindrical mirror for converging the stimulating rays 21A only in a plane parallel to the drawing sheet in FIG. 3. In the aforesaid optical system, the mirror 26c and the cylindrical lens in the aforesaid light input optical system 23 prevent pitch nonuniformity of scanning lines from arising on the recording belt 2 even though axis deviation, mirror surface inclination or the like arises with the rotating polygon mirror 24. Simultaneously with the main scanning by the stimulating rays 21A, the recording belt 2 is conveyed by the rollers 41, 42, 51 and 52 in the sub-scanning direction as indicated by the arrow in FIG. 3 at a predetermined speed. Accordingly, the stimulating rays 21A are irradiated to nearly the overall surface of the recording belt portion carrying the radiation image stored thereon at the image recording section 10.

Figure 5:
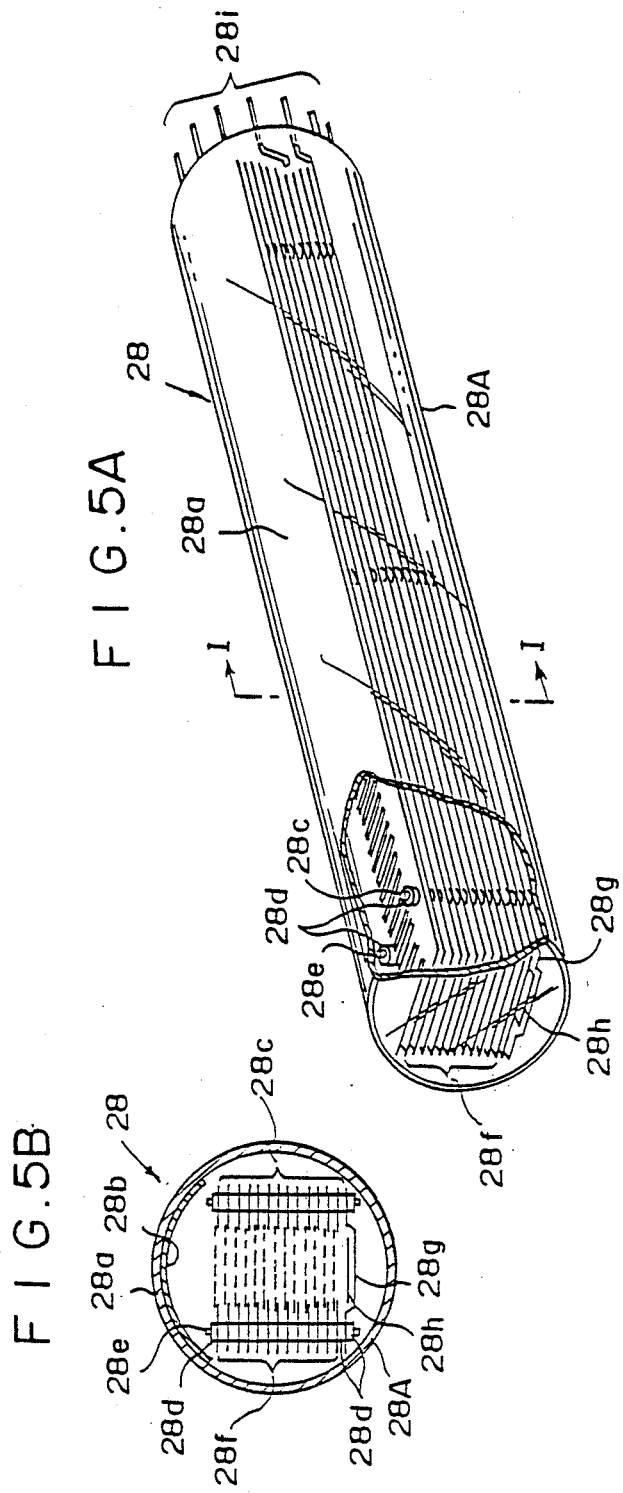

As the recording belt 2 is exposed to the stimulating rays 21A, the exposed part of the recording belt 2 emits light in proportion to the stored radiation energy, and the emitted light is detected by a photoelectric read-out means 27. In this embodiment, the photoelectric read-out means 27 comprises a long photomultiplier 28 extending in the main scanning direction at least over the length of the main scanning line, a filter 29A closely contacted with the light receiving face of the photomultiplier 28 for selectively transmitting only the light emitted by the recording belt 2 and preventing entry of the stimulating rays 21A reflected by the surface of the recording belt 2 to the photomultiplier 28, and a light guide member 29B closely contacted with the light input face of the photomultiplier 28 via the filter 29A for substantially guiding the light emitted by the recording belt 2 to the photomultiplier 28. By way of example, as shown in FIGS. 5A and 5B, the photomultiplier 28 has an electrode configuration generally called the venetian blind type. Also, a mirror 29C is disposed to face the photoelectric read-out means 27 via the scanning line for efficiently reflecting the light, which is emitted by the recording belt 2 toward the mirror 29C, to the light receiving face of the light guide member 29B. With reference to FIGS. 5A and 5B, the photomultiplier 28 comprises a cylindrical body 28A, a photocathode 28b disposed along the inner surface of the body 28A to face a light receiving face 28a, and a multiplying section 28f disposed under the photocathode 28b and including a plurality (13 pieces in this embodiment) of plate-like dynodes 28c which are stacked via insulating members 28d, 28d secured by pins 28e, 28e. The dynodes 28c are respectively constituted by a conductive plate provided with a plurality of sections cut in a U-shape and bent to form the pins 28e, 28e under the multiplying section 28f via the insulating members 28d, 28d, and an anode 28h is disposed inside of the shield electrode 28g. These electrodes are electrically connected in one-to-one relation with terminals of a terminal group 28i disposed at the side end of the body 28A. The shield electrode 28g need not necessarily be provided.

Figure 6:
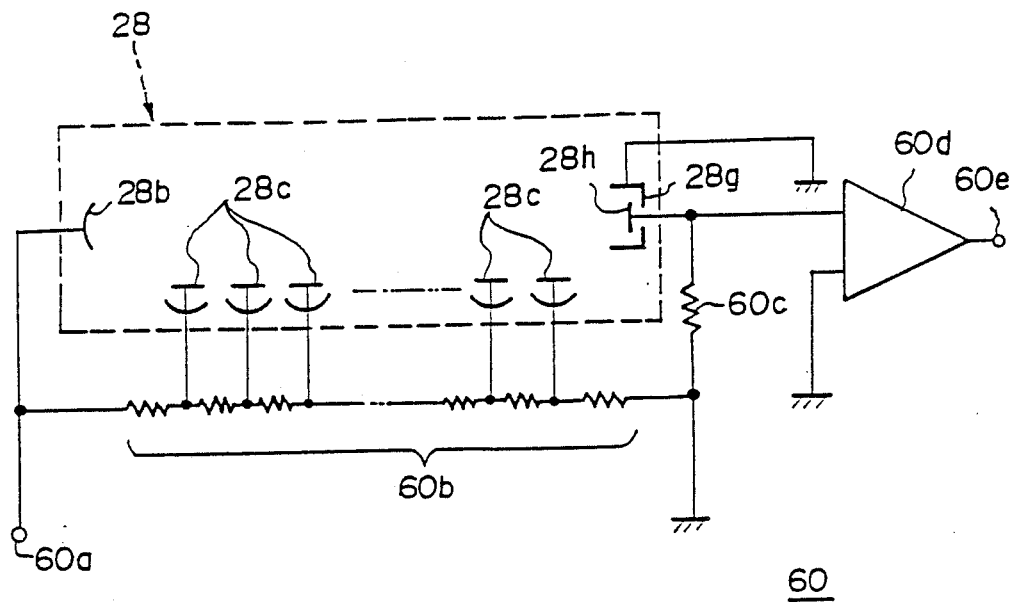
FIG. 6 is a circuit diagram showing the electric circuit for the photomultiplier shown in FIGS. 5A and 5B, FIGS. 7A and 7B are elevational views showing another example of the recording and read-out unit employed in the first radiation image recording and read-out apparatus in accordance with the present invention.

FIG. 6 shows an electric circuit 60 for operating the photomultiplier 28 and obtaining a photoelectric output. In FIG. 6, similar elements are numbered with the same reference numerals with respect to FIG. 5A. A high negative voltage is applied to the photocathode 28b via a high negative voltage applying terminal 60a. The high negative voltage applied to the high negative voltage applying terminal 60a is divided by a bleeder resistance group 60b into voltages which are applied respectively to the dynodes 28c. The shield electrode 28g is grounded, and the anode 28h is grounded via a resistor 60c and is connected with one of terminals of an amplifier 60d. The other terminal of the amplifier 60d is grounded. The photoelectrically converted image information is obtained as electric signals from an output terminal 60e of the amplifier 60d. The electric signals thus obtained are subjected to necessary image processing, and then sent to a display device such as a CRT or an image reproducing apparatus such as a recording apparatus for carrying out light beam scanning recording on a photosensitive film. By way of example, as shown in FIG. 3, a control circuit section 3 housing printed circuit boards or the like for controlling image processing or the like is provided inward from the loop of the recording belt 2.

The portion of the recording belt 2 on which the image read-out has been finished is sent by the first roller section 40 and the second roller section 50 to an erasing section 30. The erasing section 30 comprises a case 31, and a plurality of (by way of example, three) erasing light sources 32, 32, . . . constituted by fluorescent lamps or the like and disposed in the case 31. The erasing light sources 32, 32, . . . mainly produce erasing light having a wavelength within the stimulation wavelength range of the stimulable phosphor layer of the recording belt 2. The erasing light is irradiated to the overall image forming region of the recording belt 2 while the recording belt 2 is being conveyed, thereby to release radiation energy remaining on the stimulable phosphor layer of the recording belt 2 after the image read-out is finished A lead plate 6 for shielding the radiation is provided below the image recording table 14, and therefore the radiation produced by the radiation source 11 at the time of the image recording does not impinge upon the recording belt 2 positioned in the image read-out section 20 or in the erasing section 30, or does not adversely affect the image read-out section 20 and the erasing section 30. Also, in this embodiment, the image read-out and the erasing are carried out on a single image forming region simultaneously for a predetermined period. The recording belt portion on which the erasing has been finished at the erasing section 30 is conveyed to the image recording section 10 for reuse in image recording.

The radiation image recording, read-out and erasing are carried out in the manner as mentioned above by use of the recording and read-out unit 1. In this embodiment, the fluoroscopic means 80 is provided for accurately adjusting the timing of the radiation image recording. Prior to the image recording, the recording and read-out unit 1 is retracted to its second position outward from the radiation impingement range. In this condition, fluoroscopy of the image of the object 5 is carried out. Specifically, when the object 5 is placed on the image recording table 14 as shown in FIG. 1, the recording and read-out unit 1 is moved to its second position, and the radiation is irradiated by the radiation source 11 onto the object 5. The radiation passing through the object 5 passes through the image recording table 14 and impinges upon the fluoroscopic section 81, and therefore the radiation image of the object 5 is converted by the fluoroscopic section 81 to the signals for a visible image. The signals are sent to an imaging device 82 constituted by a CRT or the like via a line 83, and the radiation image is reproduced as a visible image on the imaging device 82. The operator of the apparatus carries out the image recording at the desired timing by observing the monitor image reproduced on the imaging device 82. In the course of the image recording, the irradiation of the radiation by the radiation source 11 is stopped, and the recording and read-out unit 1 is moved to its first position. At the first position, the image recording is carried out in the manner as mentioned above on the recording belt 2 inside of the recording and read-out unit 1, and then the image read-out and the erasing are carried out. The image read-out and the erasing need not necessarily be carried out with the recording and read-out unit 1 being disposed at its first position, and may be carried out in the course of conveyance of the recording and read-out unit 1 from its first position to its second position or may be carried out with the recording and read-out unit 1 being disposed at its second position.

With the recording and read-out unit 1 employed in this embodiment wherein the distance between the two roller sections is adjusted to be approximately equal to the length of a single image area, the image recording section 10 is disposed above the recording belt 2 in FIG. 3, and the image read-out section 20 and the erasing section 30 are disposed below the recording belt 2, the length of the overall apparatus in the horizontal direction can be decreased to a value approximately equal to the length of a single image area. Also, the recording and read-out unit 1 can be moved easily between the two positions by use of the unit movement means having a simple configuration. Accordingly, the radiation image recording and read-out apparatus can be made small by simplification of the apparatus configuration. Also, by the movement of the recording and read-out unit 1, the radiation image can be monitored by use of the fluoroscopic means 80, and the timing of the image recording can be adjusted accurately without relying on experience and intuition of the operator. Particularly, with the aforesaid embodiment wherein the main scanning by the stimulating rays is carried out on the circumferential surface of the roller 42 for conveying the recording belt 2, the conveyance of the recording belt 2 at the scanning position becomes very stable, and the scanning can be carried out accurately.

The stimulable phosphor layer need not necessarily be formed over the overall surface of the recording belt 2, and the stimulable phosphor layer extending over a single image area or two image areas may be formed at a part of the recording belt 2. Also, each of the first roller section 40 and the second roller section 50 may be constituted by a single roller or three or more rollers. The image recording table 14 may be formed exchangeably so that it can be replaced by a copper plate, a carbon member having low radiation absorptivity or the like when necessary. Also, a grid for absorbing the radiation scattered by the object 5 or bucky device comprising the grid and a means for reciprocal movement of the grid may be releasably provided between the recording belt 2 and the object 5. The fluoroscopic section 81 may be moved up to a position in the vicinity of the image recording table 14 as long as the recording and read-out unit 1 is being retracted to its second position. Also, the fluoroscopic section 81 may be positioned to face the radiation source 11 only in the course of the fluoroscopy and moved to a position deviated from the radiation source 11 at the time other than the fluoroscopy.

Also, the recording and read-out unit 1 is formed in the small case 7 slightly larger than the recording area for a single image. As such, there is resulted a small recording and read-out unit, and different configurations may also be employed. Different examples of the small recording and read-out unit employed in accordance with the present invention will be described hereinbelow.

Figures 7A, 7B:
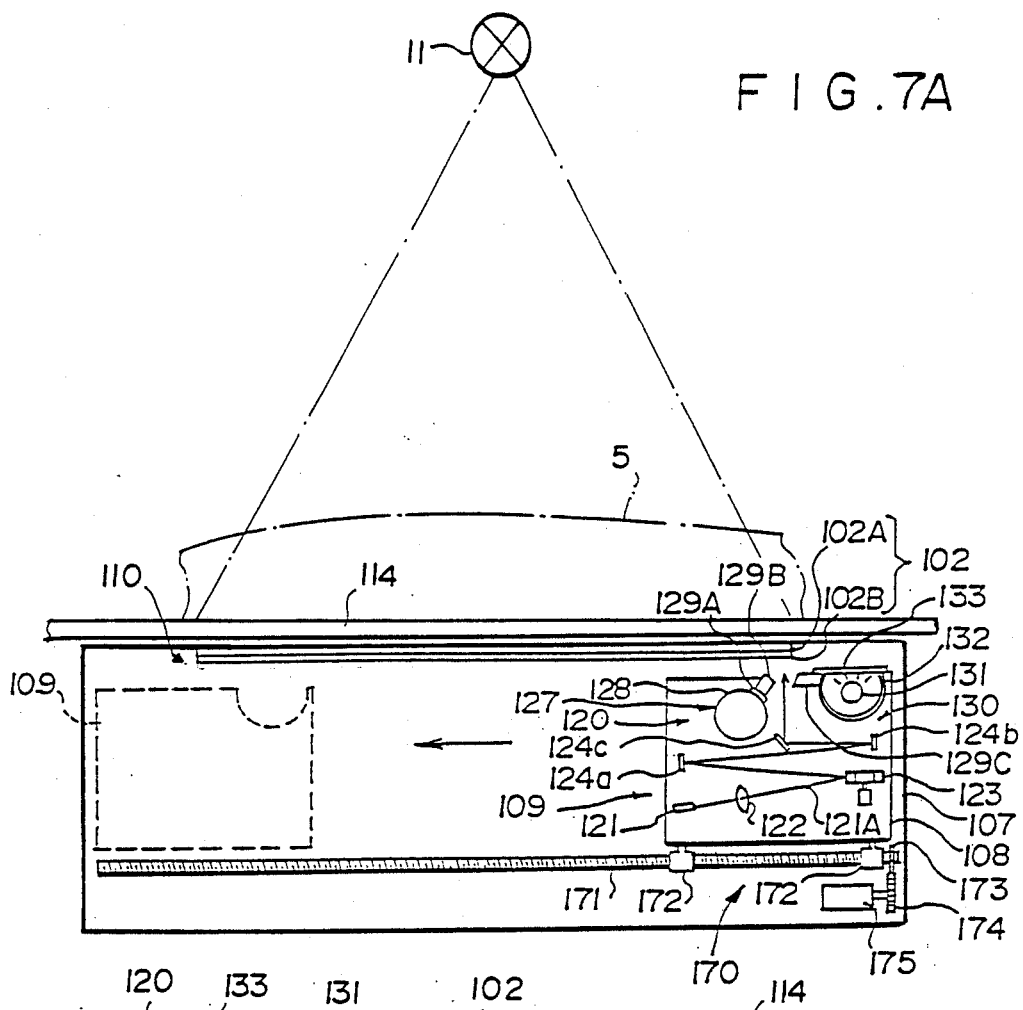

With reference to FIGS. 7A and 7B, a stimulable phosphor sheet 102 is secured in parallel with an image recording table 114 at an image recording section 110 provided at the upper part of a case 107 of a recording and read-out unit 101. The case 107 has a size slightly larger than the size of the stimulable phosphor sheet 102. The stimulable phosphor sheet 102 is composed of a radiation-permeable substrate 102A and a stimulable phosphor layer 102B overlaid on the substrate 102B.

A read-out and erasing section 109 comprising a box 108, and an image read-out section 120 and an erasing section 130 integrally housed close to each other in the box 108 is provided below the stimulable phosphor sheet 102. The read-out and erasing section 109 is reciprocally moveable while facing the stimulable phosphor sheet 102 between the right end position (first position) as indicated by the solid line in FIG. 7A and the left end position (second position) as indicated by the solid line in FIG. 7B. In this embodiment, movement from the first position to the second position is referred to as forward movement, and movement from the second position to the first position is referred to as backward movement. Also, by way of example, a movement means 170 for reciprocally moving the read-out and erasing section 109 is composed of a screw rod 171 extending in the direction of movement of the read-out and erasing section 109, supporting members 172, 172 engaged with the screw rod 171, a gear 173 secured to the screw rod 171, a gear 174 meshing with the gear 173, and a motor 175 for rotating the gear 174 in the normal and reverse directions. The screw rod 171 is rotated by the motor 175 via the gears 173 and 174, thereby to move the supporting members 172, 172 forward and backward and carry out reciprocal movement of the read-out and erasing section 109.

The recording and read-out unit 101 can be employed as a substitute for the recording and read-out unit 1 in the apparatus shown in FIG. 1. In this case, as in the aforesaid embodiment, the radiation produced by the radiation source and passing through the object 5 is irradiated to the stimulable phosphor sheet 102. In this manner, the radiation image is stored on the stimulable phosphor layer 102B of the stimulable phosphor sheet 102.

The image read-out section 120 is provided with a stimulating ray scanning means which comprises a stimulating ray source 121 constituted by a semiconductor laser or the like, a condensing lens 122 disposed in the optical path of stimulating rays 121A produced by the stimulating ray source 121, a rotating polygon mirror 123 as a light deflector for deflecting the stimulating rays 121A passing through the condensing lens 122 at an angle normal to the drawing sheet in FIG. 7A, thereby to scan the stimulating rays 121A in a main scanning direction on the stimulable phosphor sheet 102, and mirrors 124a, 124b and 124c for changing the optical path of the stimulating rays 121A. The stimulating rays 121A is made by the stimulating ray scanning means to repeatedly scan the stimulable phosphor sheet 102 in the main scanning direction. On the other hand, simultaneously with the scanning of the stimulating rays 121A in the main scanning direction, the read-out and erasing section 109 is conveyed by the movement means 170 at a predetermined speed leftward in FIG. 7A. As a result, the sub-scanning by the stimulating rays 121A is carried out, and almost the overall surface of the stimulable phosphor sheet 102 is exposed to the stimulating rays 121A. As the stimulable phosphor sheet 102 is exposed to the stimulating rays 121A, the exposed portion of the sheet 102 emits light in proportion to the stored radiation energy, and the emitted light is detected by a photoelectric read-out means 127 of the image read-out section 120.

In this embodiment, the photoelectric read-out means 127 is formed in the same manner as in the recording and read-out unit 1 shown in FIG. 3 and comprises a long photomultiplier 128, a filter 129A, a light guide member 129B, and a mirror 129C for reflecting the light emitted by the stimulable phosphor sheet 102 toward the light receiving face of the light guide member 129B. When the image read-out by the photoelectric read-out means 127 has been finished, as shown in FIG. 7B, the read-out and erasing section 109 is conveyed rightward from its second position to its first position. An erasing means 130 is provided with an erasing light source 131 constituted by a fluorescent lamp or the like and extending in the main scanning direction, and a reflection plate 132 for reflecting the erasing light, that is radiated downward by the erasing light source 131, toward the surface of the stimulable phosphor sheet 102. Also, in this embodiment, the erasing light source 131 is normally turned on. Therefore, a moveable shutter 133 is provided so that it is disposed above the erasing light source 131 as shown in FIG. 7A to shield the erasing light at the time the image recording and the image read-out are carried out, and is retracted to the position above the photomultiplier 128 as shown in FIG. 7B to lay bare the erasing light source 131 only when the erasing is to be carried out. The moveable shutter 133 need not necessarily be provided in the case where the erasing light source 131 is turned on only when the erasing is to be carried out, and is turned off in the steps other than the erasing. As the read-out and erasing section 109 is moved in the manner as mentioned above, the erasing light source 131 irradiates the erasing light to the overall surface of the stimulable phosphor sheet 102. The erasing light source 131 mainly produces light having a wavelength within the stimulation wavelength range of the stimulable phosphor sheet 102, and radiation energy remaining on the sheet 102 after the image read-out therefrom has been carried out is released from the sheet 102 when the sheet 102 is exposed to the erasing light. The stimulable phosphor sheet 102 thus erased can be reused for image recording, and the read-out and erasing section 109 is returned to its first position.

With the recording and read-out unit 101 wherein a single stimulable phosphor sheet 102 is secured and held, and the image read-out and erasing are carried out by reciprocally moving the read-out and erasing section 109, the length of the recording and read-out unit 101 can be decreased nearly to the length of a single stimulable phosphor sheet 102.

In the recording and read-out unit 101, the stimulating rays 121A are scanned and the light emitted by the stimulable phosphor sheet 102 is detected by the photomultiplier 128. However, as proposed in, for example, Japanese Patent Application No. 62(1987)-21957, it is also possible to linearly irradiate the stimulating rays to the stimulable phosphor sheet 102, and to detect the emitted light by a line sensor. This also applies to the recording and read-out unit 1 shown in FIG. 3, and the recording and read-out units as will be described later.

A further example of the recording and read-out unit employed in accordance with the present invention will hereinbelow be described with reference to FIG. 8. In a case 207 of a recording and read-out unit 201 shown in FIG. 8, a first wind-up shaft 241 and a second wind-up shaft 242 are provided in spaced and parallel relation to each other. The distance between the first wind-up shaft 241 and the second wind-up shaft 242 is adjusted to be slightly longer than the length of a single image area of the image recorded on a stimulable phosphor sheet 202 as will be described later. The first wind-up shaft 241 and the second wind-up shaft 242 are respectively rotated by motors 243 and 244 as the sheet feed means rotates in a direction of either one of counter-clockwise and clockwise in FIG. 8. One end side of the stimulable phosphor sheet 202 capable of storing the radiation image thereon is wound around the first wind-up shaft 241. The stimulable phosphor sheet 202 is formed in the long strip-like shape by use of a flexible substrate. The other end side of the stimulable phosphor sheet 202 is supported by the second wind-up shaft 242 so that the sheet 202 can be wound up therearound. Also, the stimulable phosphor sheet 202 is applied between a roller 246 and rollers 247, 247 disposed between the first wind-up shaft 241 and the second wind-up shaft 242. The stimulable phosphor sheet 202 is positioned so that the flexible substrate substantially permeable to the radiation faces up and the stimulable phosphor layer overlaid on the substrate faces down. With the recording and read-out unit 201, the recording of the radiation image of the object is carried out in the same manner as with the aforesaid recording and read-out units 1 and 101. Specifically, in the recording and read-out unit 201, an image recording section 210 is formed between the roller 246 and the rollers 247, 247.

An image read-out section 220 is provided below the stimulable phosphor sheet 202 in the vicinity of the second wind-up shaft 242. The image read-out section 220 is constituted by a stimulating ray source 221 which may be a semiconductor laser, a rotating polygon mirror 223 as a light deflector for reflecting and deflecting stimulating rays 221A produced by the stimulating ray source 221, a long mirror 224 for reflecting the deflected stimulating rays 221A so that the stimulating rays 221A one-dimensionally scans the stimulable phosphor sheet 202, specifically the stimulable phosphor layer thereof, the drive rollers 247, 247 composed of a pair of nip rollers for grasping the stimulable phosphor sheet 202 therebetween and acting as a sub-scanning means rotated at a predetermined speed, a long photomultiplier 227 disposed so that the light receiving face thereof extends along the scanning line (main scanning line) of the stimulating rays 221A on the stimulable phosphor sheet 202, and a long light guiding reflection mirror 229 extending along the long photomultiplier 227. In this embodiment, the photomultiplier 227 has the electrode configuration referred to as the box type. However, the photomultiplier of the type as shown in FIGS. 5A and 5B may also be employed. After a radiation image of the object is stored on the stimulable phosphor sheet 202 in the manner as mentioned above, the drive rollers 247, 247 are rotated to convey the stimulable phosphor sheet 202 at a predetermined speed rightward in FIG. 8. At this time, the second wind-up shaft 242 is rotated to wind up the stimulable phosphor sheet 202 therearound. An appropriate load has been given to the first wind-up shaft 241 by a known means (not shown) to maintain the stimulable phosphor sheet 202 in the tensioned condition. As the stimulable phosphor sheet 202 is thus conveyed, the stimulating ray source 221 and the rotating polygon mirror 223 are operated so that the stimulating rays 221A scan the stimulable phosphor sheet 202. The portion of the stimulable phosphor sheet 202 exposed to the stimulating rays 221A emits the light carrying the radiation image stored on the stimulable phosphor sheet 202. The emitted light is efficiently detected by the photomultiplier 227 directly or after being reflected by the light guiding reflection mirror 229. Simultaneously with the main scanning of the stimulating rays 221A, the stimulable phosphor sheet 202 is conveyed in the sub-scanning direction, and consequently the detection of the light emitted by the stimulable phosphor sheet 202 is carried out two-dimensionally.

The portion of the stimulable phosphor sheet 202 for which the image read-out has been finished in the manner as mentioned above is wound up around the second wind-up shaft 242. Also, a subsequent portion of the stimulable phosphor sheet 202 that has been wound around the first wind-up shaft 241 is fed to the position between the roller 246 and the drive rollers 247, 247, and it becomes possible to record a radiation image on said portion of the sheet 202 in the same manner as mentioned above. After the radiation image recording has thus been carried out over approximately the overall length of the stimulable phosphor sheet 202 and the sheet 202 that has been wound around the first wind-up shaft 241 has been delivered toward the second wind-up shaft 242, the motor 243 is operated to rotate the first wind-up shaft 241 counter-clockwise. Thus the stimulable phosphor sheet 202 on which the image read-out has been finished and which has been wound around the second wind-up shaft 242 is returned to the first wind-up shaft 241. At this time, the stimulable phosphor sheet 202 passes over an erasing section 230 provided between the roller 246 and the drive rollers 247, 247, and is subjected to image (residual image) erasing. By way of example, the erasing section 230 is constituted by a plurality of erasing light sources 231, 231, . . . positioned below the stimulable phosphor sheet 202. The erasing light sources 231, 231, . . . are constituted by fluorescent lamps or the like, and produce erasing light having a wavelength within the stimulation wavelength range for the stimulable phosphor of the stimulable phosphor sheet 202. The erasing light sources 231, 231, . . . are turned on at the time the stimulable phosphor sheet 202 is returned to the first wind-up shaft 241. Upon exposure to the erasing light, the radiation energy remaining on the stimulable phosphor sheet 202 after the image read-out therefrom has been finished is released from the sheet 202.

In this manner, the stimulable phosphor sheet 202 on which the image (residual image) erasing has been effected to such an extent that the sheet 202 can be reused for the radiation image recording is stored around the first wind-up shaft 241. Therefore, the radiation image recording and the read-out can be repeated by use of the erased reusable stimulable phosphor sheet 202.

Figure 8:
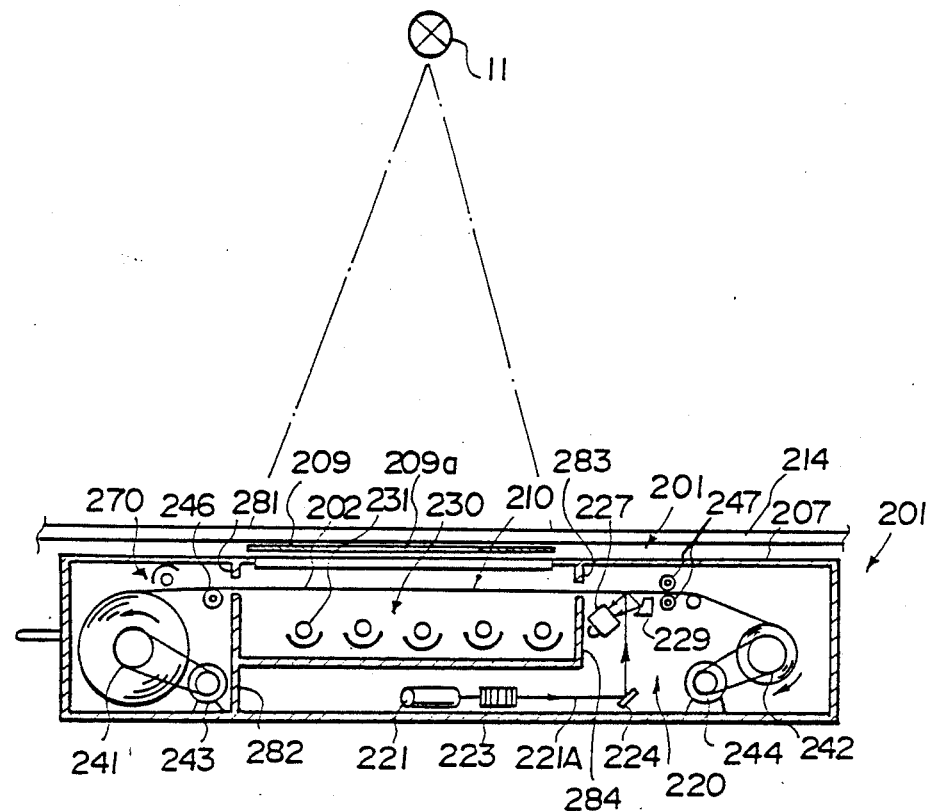
FIG. 8 is a side view showing a further example of the recording and read-out unit employed in the first radiation image recording and read-out apparatus in accordance with the present invention.

In the embodiment shown in FIG. 8, a secondary erasing light source 270 for carrying out secondary erasing is provided between the first wind-up shaft 241 and the image recording section 210. The secondary erasing light source 270 is composed of a light source of the same type as the erasing light sources 231, 231, . . . at the erasing section 230, and is turned on to irradiate the erasing light to the stimulable phosphor sheet 202 at the time the sheet 202 is delivered from the first wind-up shaft 241 for carrying out the radiation image recording. In the case where the stimulable phosphor sheet 202 has been stored around first wind-up shaft 241 without being used for a long period after being subjected to the image (residual image) erasing at the erasing section 230, the stimulable phosphor sheet 202 stores energy of radiations emitted by radioactive isotopes such as Ra226, which are contained as impurities in the stimulable phosphor, or energy of environmental radiations. These types of radiation energy undesirably stored on the stimulable phosphor sheet 202 cause noise in a radiation image recorded next on the stimulable phosphor sheet 202. Exactly prior to the image recording, such radiation energy is erased by exposing the stimulable phosphor sheet 202 to the secondary erasing light produced by the secondary erasing light source 270. The secondary erasing light is intercepted by light shielding plates 281 and 282 so that the sheet 202 prior to the image read-out is not exposed thereto.

In the aforesaid embodiment shown in FIG. 8, the radiation image stored on the stimulable phosphor sheet 202 is read out at the image read-out section 220 immediately after the image recording is carried out. However, the embodiment may also be used for repeating the image recording prior to the image read-out at the image read-out section 220. In this case, the image-recorded portions of the stimulable phosphor sheet 202 are wound up around the second wind-up shaft 242 without carrying out the image read-out. After the sequential image recording is thus finished, the stimulable phosphor sheet 202 is returned from the second wind-up shaft 242 toward the first wind-up shaft 241, and the image read-out is carried out at the image read-out section 220 in the course of said returning of the sheet 202. In this case, the erasing light produced by the erasing light sources 231, 231, . . . is intercepted by light shielding plates 283 and 284 so that the stimulable phosphor sheet 202 prior to the image read-out is not exposed thereto.

Figure 9:
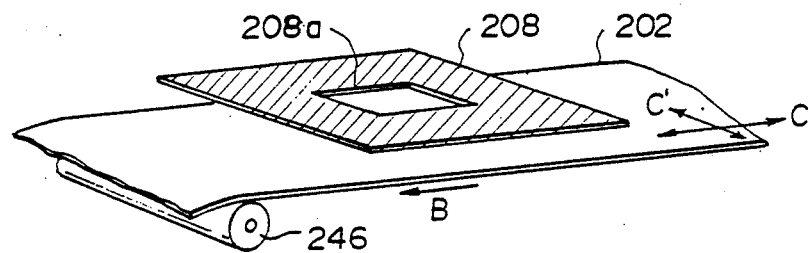
FIG. 9 is a perspective view showing a radiation shielding plate and a stimulable phosphor sheet.

In the aforesaid embodiment, as shown in FIG. 9, a radiation shielding plate 208 formed of lead or the like and having an opening 208a of a predetermined size may be provided between the image recording table 214 and the stimulable phosphor sheet 202 at the image recording position, and subdivision image recording may be carried out by use of the radiation shielding plate 208 as disclosed in Japanese Unexamined Patent Publication No. 61(1986)-98340. Specifically, the stimulable phosphor sheet 202 in the recording and read-out unit 201 is fed stepwise in the direction as indicated by the arrow B with respect to the radiation shielding plate 208, and two or more images are recorded side by side on a single image recording area. Alternatively, the whole recording and read-out unit 201 is moved stepwise in two directions as indicated by the arrows C and C' in FIG. 9, thereby to record, by way of example, four images side by side on a single image recording area.

Figure 10:
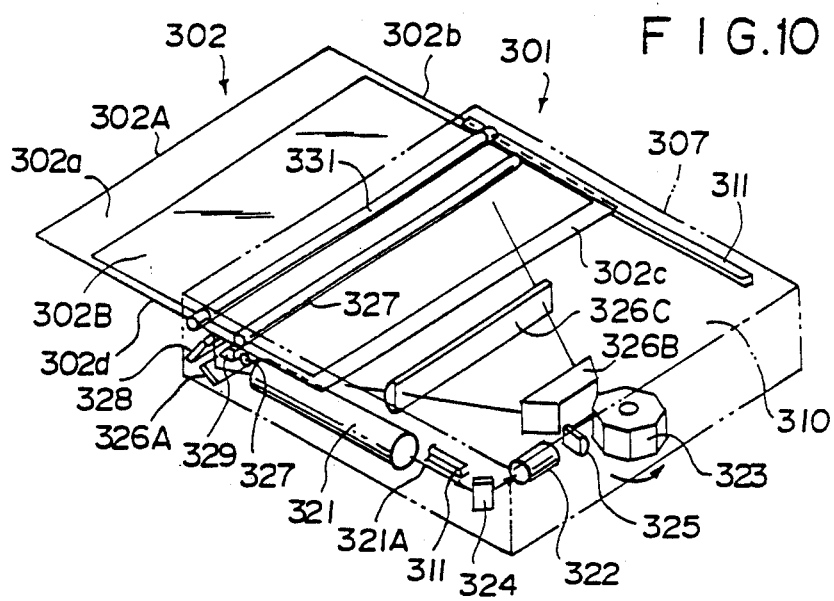
FIG. 10 is a perspective view showing a still further example of the recording and read-out unit employed in the first radiation image recording and read-out apparatus in accordance with the present invention.
Figure 11A:
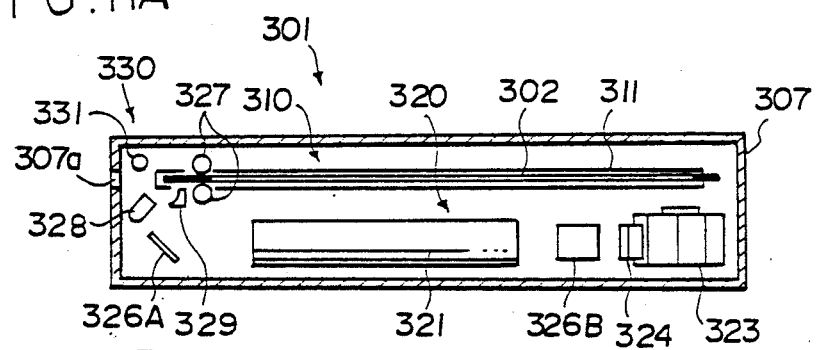
FIGS. 11A and 11B are side views showing the recording and read-out unit shown in FIG. 10, FIGS. 12, 13 and 14 are schematic side views showing an embodiment of the second radiation image recording and read-out apparatus in accordance with the present invention.

A still further example of the recording and read-out unit employed in the radiation image recording and read-out apparatus in accordance with the present invention will hereinbelow be described with reference to FIGS. 10, 11A and 11B. In a case 307 of a recording and read-out unit 301, a stimulable phosphor sheet 302 composed of, by way of example, a transparent plate-like substrate 302A and a stimulable phosphor layer 302B overlaid thereon is provided. The substrate 302A of the stimulable phosphor sheet 302 is formed to be larger than the stimulable phosphor layer 302B, and the portions of the substrate 302A around the stimulable phosphor layer 302B constitute holding portions 302a, 302b, 302c and 302d. In this embodiment, the stimulable phosphor sheet 302 is disposed so that the stimulable phosphor layer 302B comes under the substrate 302A, and is supported in the case 307 with the holding portions 302b and 302d being slideably supported on rails 311, 311. Specifically, the upper part of the case 307 including the rails 311, 311 is constituted as an image recording section 310 for holding the stimulable phosphor sheet 302 in the course of the radiation image recording. The longitudinal and transverse dimensions of the case 307 are adjusted to be slightly larger than those of the stimulable phosphor sheet 302. Also, as shown in FIG. 11A, an end of the case 307 is provided with the elongated opening 307a which faces the edge face of the stimulable phosphor sheet 302. The regions of the case 307 outside of the region facing the image recording section 310 are lined with a radiation absorbing material such as a lead plate so that no fog is caused to arise on the stimulable phosphor sheet 302 by environmental radiations or the like other than the radiation used for the image recording.

With the recording and read-out unit 301, the recording of the radiation image of the object is carried out in the same manner as with the aforesaid recording and read-out units 1, 101 and 201, and the radiation image of the object is stored on the stimulable phosphor sheet 302, specifically on the stimulable phosphor layer 302B formed on the lower surface side of the sheet 302.

An image read-out section 320 is provided below the stimulable phosphor sheet 302 in the case 307. The image read-out section 320 is provided with a stimulating ray source 321 constituted by a laser or the like, a mirror 324 for reflecting the stimulating rays 321A produced by the stimulating ray source 321, a beam expander 322 for adjusting the beam diameter of the stimulating rays 321A to a predetermined value, a cylindrical lens 325 for making the stimulating rays 321A impinge upon the mirror surface of a rotating polygon mirror 323 as will be described later so as to form a linear image, and the rotating polygon mirror 323 as a light deflector for reflecting and deflecting the stimulating rays 321A. The image read-out section 320 is also provided with a long mirror 326A for reflecting the deflected stimulating rays 321A so that the stimulating rays 321A scan the stimulable phosphor layer 302B of the stimulable phosphor sheet 302 in one direction, and the drive rollers 327, 327 as the sub-scanning means composed of a pair of nip rollers for gripping the stimulable phosphor sheet 302 therebetween and rotated at a predetermined speed. The image read-out section 320 also comprises a long photomultiplier 328 positioned so that the light receiving face thereof extends along the scanning line (main scanning line) of the stimulating rays 321A on the stimulable phosphor sheet 302, and a long light guiding reflection mirror 329 extending along the long photomultiplier 328. Also, an fθ lens 326B and a cylindrical lens 326C are provided between the rotating polygon mirror 323 and the mirror 326A, and the stimulating rays 321A are thereby made to converge to a predetermined beam diameter at every position on the stimulable phosphor sheet 302.

Figure 11B:
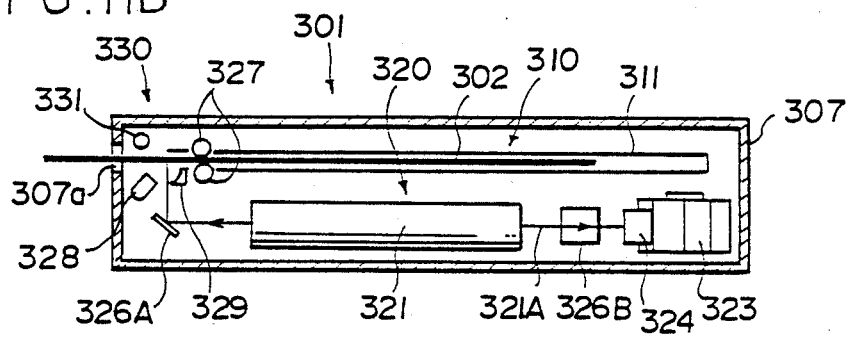

With reference to FIG. 11B, after the radiation image of the object has been stored on the stimulable phosphor sheet 302 in the manner as mentioned above, the drive rollers 327, 327 are rotated, and the stimulable phosphor sheet 302 is moved at a predetermined speed toward the opening 307a. In the course of the radiation image recording, the drive rollers 327, 327 grasp the holding portion 302a formed at one end of the stimulable phosphor sheet 302. Therefore, when the drive rollers 327, 327 are rotated after the image recording has been carried out, the stimulable phosphor sheet 302 can be immediately conveyed as mentioned above. Simultaneously with the conveyance of the stimulable phosphor sheet 302, the stimulating ray source 321 and the rotating polygon mirror 323 are activated, and the stimulating rays 321A scan on the stimulable phosphor sheet 302. The light emitted by the stimulable phosphor sheet 302 is efficiently detected by the photomultiplier 328 directly or after being reflected by the light guiding reflection mirror 329. The scanning of the stimulating rays 321A in the main scanning direction is carried out in the manner as mentioned above and, at the same time, the stimulable phosphor sheet 302 is moved in the sub-scanning direction in the manner as mentioned above. Accordingly, the emitted light is two-dimensionally read out from the stimulable phosphor sheet 302.

As shown in FIG. 11B, when the stimulable phosphor sheet 302 is moved for the purpose of the sub-scanning, the stimulable phosphor sheet 302 is projected out of the case 307 through the opening 307a. Also, the stimulating rays 321A scan the stimulable phosphor sheet 302 at the position near the opening 307a. Therefore, at the time the image read-out has been finished, nearly the most part of the stimulable phosphor sheet 302 is projected out of the case 307. Accordingly, the case 307 need not be provided with a particular space for sub-scanning of the stimulable phosphor sheet 302, and may be formed in a size slightly larger than the size of the stimulable phosphor sheet 302.

At the time the image read-out has been finished in the manner as mentioned above, the holding portion 302c of the stimulable phosphor sheet 302 is grasped between the drive rollers 327, 327. Then, the drive rollers 327, 327 are rotated in the directions reverse to the directions of rotation at the time of the image read-out, and the stimulable phosphor sheet 302 is thereby returned to the image recording section 310 inside of the case 307. At this time, the stimulable phosphor sheet 302 passes over an erasing section 330 provided in the vicinity of the opening 307a in the case 307, and is subjected to the image (residual image) erasing. The erasing section 330 is constituted by an erasing light source 331 provided above the stimulable phosphor sheet 302.

In this manner, the stimulable phosphor sheet 302 on which the image (residual image) has been erased to such an extent that the stimulable phosphor sheet 302 becomes reusable for the radiation image recording is housed in the case 307. Therefore, the image recording and the image read-out can be repeated by use of the stimulable phosphor sheet 302. The erasing section 330 may also be constituted by disposing a surface type erasing light source, which may be an EL (electroluminescence) plate, so that it faces the stimulable phosphor sheet 302 at the image recording position from below, i.e. from the side of the stimulable phosphor layer 302B. In this case, the substrate 302A of the stimulable phosphor sheet 302 need not necessarily be formed of a transparent material. With this configuration, the aforesaid secondary erasing can be carried out easily by the utilization of the surface type erasing light source.

Embodiments of the second radiation image recording and read-out apparatus in accordance with the present invention will hereinbelow be described with reference to FIGS. 12 to 20.

Figure 12:
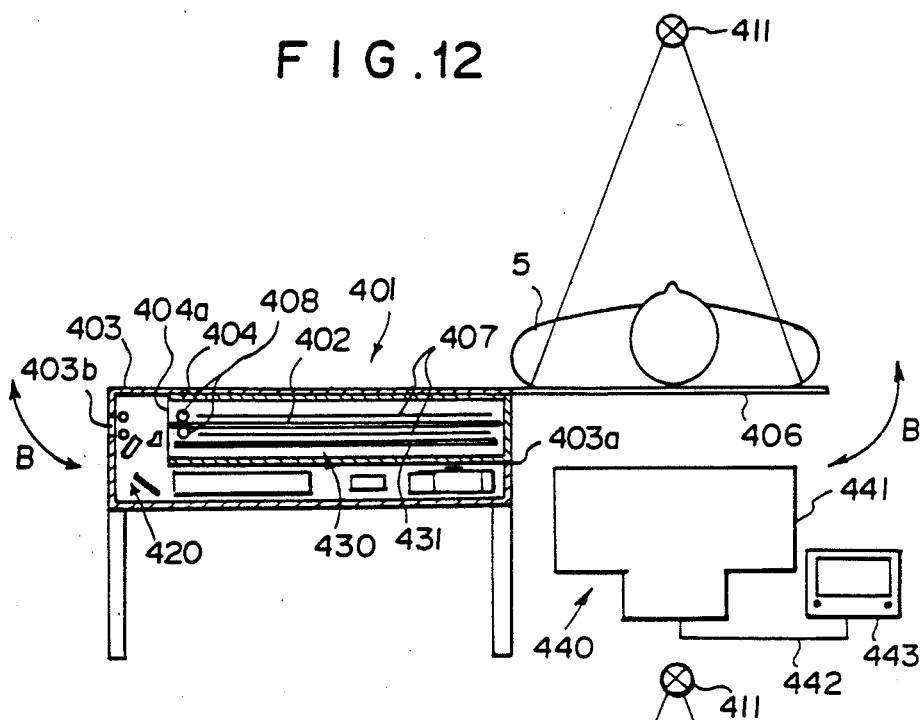
Figure 13:
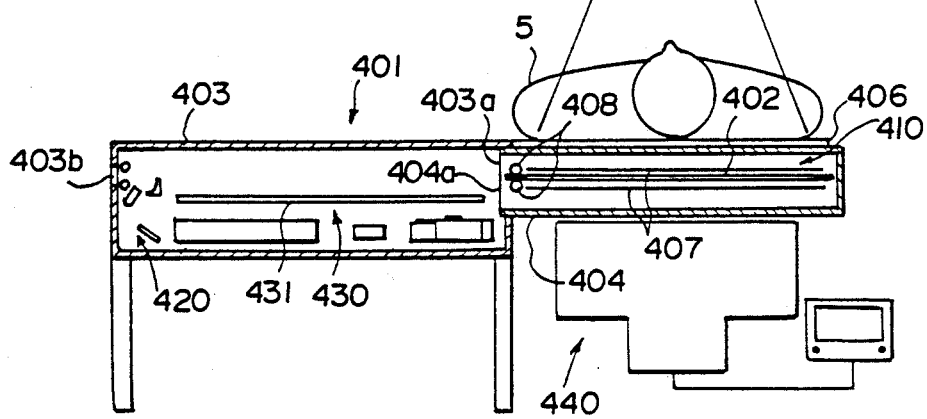
Figure 14:
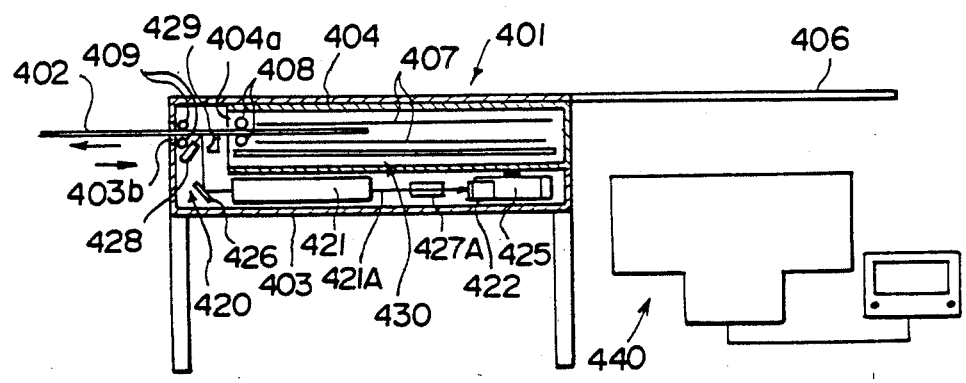

With reference to FIGS. 12, 13 and 14, an embodiment of the second radiation image recording and read-out apparatus in accordance with the present invention is provided with a recording and read-out unit 401 comprising a case 403 having longitudinal and transverse dimensions slightly larger than the size of a single image area formed on the stimulable phosphor sheet 402, an image read-out section 420 and an erasing section 430 housed in the case 403, and a light shielding cover 404 housed in the case 403 for projection out of the case 403 and holding the stimulable phosphor sheet 402 at an image recording position at the time the light shielding cover 404 is projected out of the case 403. The embodiment is also provided with an image recording table 406 extending horizontally from the upper surface of the case 403 of the recording and read-out unit 401 so that the object 5 is placed on the image recording table 406, and a fluoroscopic means 440 provided below the image recording table 406. A radiation source 411 constituted by an X-ray source or the like is provided above the image recording table 406. This embodiment should preferably be provided with a mechanism for tilting the whole apparatus including the radiation source 411 in the direction as indicated by the arrow B in FIG. 12.

The image recording table 406 is permeable to radiation. As shown in FIG. 12, at the time the object 5 is placed on the image recording table 406, radiation is irradiated onto the object 5 with the light shielding cover 404 housed in the case 403, and monitoring of the image by use of the fluoroscopic means 440 is carried out for accurately adjusting the timing of the image recording prior to the image recording on the stimulable phosphor sheet 402. The fluoroscopic means 440 is provided with a fluoroscopic section 441 composed of, for example, a combination of an image intensifier tube with a television camera. The radiation passing through the object 5 passes through the image recording table 406 and impinges upon the fluoroscopic section 441, and therefore the radiation image of the object 5 is converted by the fluoroscopic section 441 to the signals for a visible image. The signals are sent to an imaging device 443 constituted by a CRT or the like via a line 442, and the radiation image is reproduced as a visible image on the imaging device 443. The operator of the apparatus carries out the image recording at the desired timing by observing the monitor image reproduced on the imaging device 443. In the course of the image recording, the irradiation of the radiation by the radiation source 411 is stopped, and the light shielding cover 404 is automatically pulled out of the case 403 and positioned below the image recording table 406 as shown in FIG. 13.

The case 403 is provided with an opening 403a at the case end on the side of the image recording table 406, and the light shielding cover 404 housed in the case 403 is projectable out of the case 403 through the opening 403a. The light shielding cover 404 is moved by a drive device and projected out of the case 403. The light shielding cover 404 is provided with a sheet passage opening 404a for the stimulable phosphor sheet 402 at the end on the side supported by the case 403 when the light shielding cover 404 is projected out of the case 403.

Figure 15:
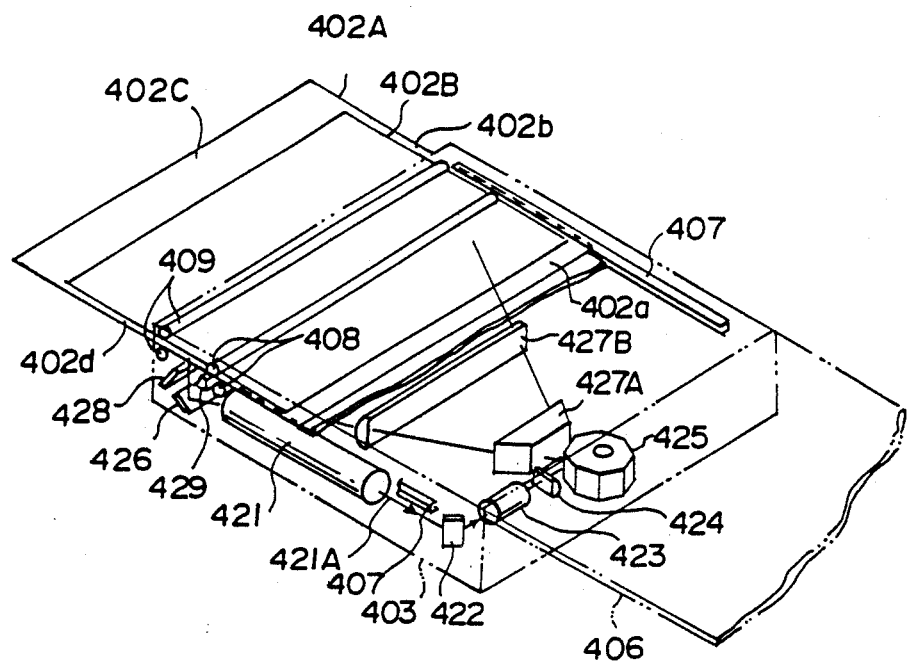
FIG. 15 is a perspective view showing the part in the vicinity of the image read-out section in the embodiment shown in FIGS. 12, 13 and 14.

As shown in FIG. 15, the light shielding cover 404 is provided therein with rails 407, 407 and nip rollers 408, 408. The stimulable phosphor sheet 402 is supported at both side edges thereof by the rails 407, 407, and is projected together with the light shielding cover 404 out of the case 403 with one edge portion of the sheet 402 being grasped between the nip rollers 408, 408. The stimulable phosphor sheet 402 is composed of a plate-like substrate 402A and a stimulable phosphor layer 402B overlaid thereon. The substrate 402A of the stimulable phosphor sheet 402 is formed to be larger than the stimulable phosphor layer 402B, and the portions of the substrate 402A around the stimulable phosphor layer 402B constitute holding portions 402a, 402b, 402c and 402d which are to be supported on the rails 407, 407 and grasped between the nip rollers 408, 408. Reverting to FIG. 13, at the time the light shielding cover 404 has been projected out of the case 403, the stimulable phosphor sheet 402 inside of the light shielding cover 404 is held at the image recording position below the image recording table 406, and the radiation source 411 is activated in this condition. As a result, the radiation passing through the object 5 is irradiated onto the stimulable phosphor sheet 402, and a radiation image of the object 5 is stored thereon, specifically on the stimulable phosphor layer 402B formed on the lower surface side of the stimulable phosphor sheet 402. Thus, in this embodiment, an image recording section 410 is constituted by the light shielding cover 404 at its projected-out position and the image recording table 406. The regions of the light shielding cover 404 outside of its upper surface are lined with a radiation absorbing material such as a lead plate so that no fog is caused to arise on the stimulable phosphor sheet 402 by environmental radiations or the like other than the radiation used for the image recording. As shown in FIG. 14, after the image recording has been carried out in the manner as mentioned above, the light shielding cover 404 is immediately housed in the case 403, and the image stored on the stimulable phosphor layer 402B of the stimulable phosphor sheet 402 is read out by the image read-out section 420 provided in the case 403. The image read-out will hereinbelow be described with reference to FIGS. 14 and 15.

The image read-out section 420 is provided with a laser beam source 421, a mirror 422 for reflecting a laser beam 421A produced as stimulating rays by the laser beam source 421, a beam expander 423 for adjusting the beam diameter of the laser beam 421A to a predetermined value, a cylindrical lens 424 for making the laser beam 421A impinge upon a mirror surface of a light deflector 425 as will be described later so as to form a linear image normal to the rotation axis of the light deflector 425, and the light deflector 425 constituted by a rotating polygon mirror or the like for reflecting and deflecting the laser beam 421A. The image read-out section 420 is also provided with a long mirror 426 for reflecting the deflected laser beam 421A so that the laser beam 421A scans the stimulable phosphor sheet 402, specifically the stimulable phosphor layer 402B thereof, in one direction, and the nip rollers 409, 409 for grasping the stimulable phosphor sheet 402 therebetween, and rotated at a predetermined speed, thereby to act as a sub-scanning means together with the nip rollers 408, 408. The image read-out section 420 also comprises a long photomultiplier 429 as the photoelectric read-out means positioned so that the light receiving face thereof extends along the scanning line (main scanning line) of the laser beam 421A on the stimulable phosphor sheet 402, and a long light guiding reflection mirror 428 extending along the long photomultiplier 429. Also, an $f\theta$ lens 427A and a cylindrical lens 427B are provided between the light deflector 425 and the mirror 426, and the laser beam 421A is thereby made to converge to a predetermined beam diameter at every position on the stimulable phosphor sheet 402.

With reference to FIG. 14, after the radiation image of the object 5 has been stored on the stimulable phosphor sheet 402 in the manner as mentioned above, and the light shielding cover 404 in which the stimulable phosphor sheet 402 is housed has been moved into the case 403, the stimulable phosphor sheet 402 is moved by the nip rollers 408, 408 and the nip rollers 409, 409 at a predetermined speed in the leftward direction. Also, a slit 403b through which the stimulable phosphor sheet 402 is to be passed is formed in the end surface of the case 403 on the side opposite to the image recording table 406, and the image read-out from the stimulable phosphor sheet 402 is carried out while the stimulable phosphor sheet 402 is being conveyed out of the recording and read-out unit 401 through the opening 404a of the light shielding cover 404 and the slit 403b. At the time the stimulable phosphor sheet 402 is thus conveyed, the laser beam source 421 and the light deflector 425 are activated, and the laser beam 421A scans on the stimulable phosphor sheet 402. As the stimulable phosphor sheet 402 is exposed to the laser beam 421A, the exposed portion of the stimulable phosphor sheet 402 emits light carrying the radiation image stored thereon. The emitted light is efficiently detected by the long photomultiplier 428 directly or after being reflected by the light guiding reflection mirror 429.

The photomultiplier 428 employed in this embodiment extends in the main scanning direction over a length not shorter than the length of the main scanning line. By way of example, as shown in FIGS. 16A and 16B, the photomultiplier 428 has an electrode configuration generally referred to as the box type. The photomultiplier 428 comprises a vacuum body 428A formed of glass or the like, a photocathode (photoelectric face) 428b disposed to face a long light receiving face 428a for producing photoelectrons in the vacuum body 428A, and a multiplying section 428d disposed under the photocathode 428b in the vacuum body 428A and including a plurality (13 pieces in this example) of electrodes (dynodes) 428c, 428c, . . . having a quarter cylinder shape and exhibiting the secondary electron emission effect. A shield electrode 428e is disposed to face the lowermost dynode 428c of the multiplying section 428d, and an anode 428f for collecting the electron streams multiplied by the multiplying section 428d and generating a signal is positioned inside of the shield electrode 428e. These electrodes are respectively connected electrically in one-to-one relation with terminals 428h, 428h, . . . of a terminal group 428g disposed on the side opposite to the light receiving face 428a. The dynodes 428c, 428c, . . . and the shield electrode 428e are secured inside of the body 428A by supporting members 428*i*, 428*i*, 428*i* fabricated of an insulating material. The shield electrode 428*e* need not necessarily be provided.

Figure 17:
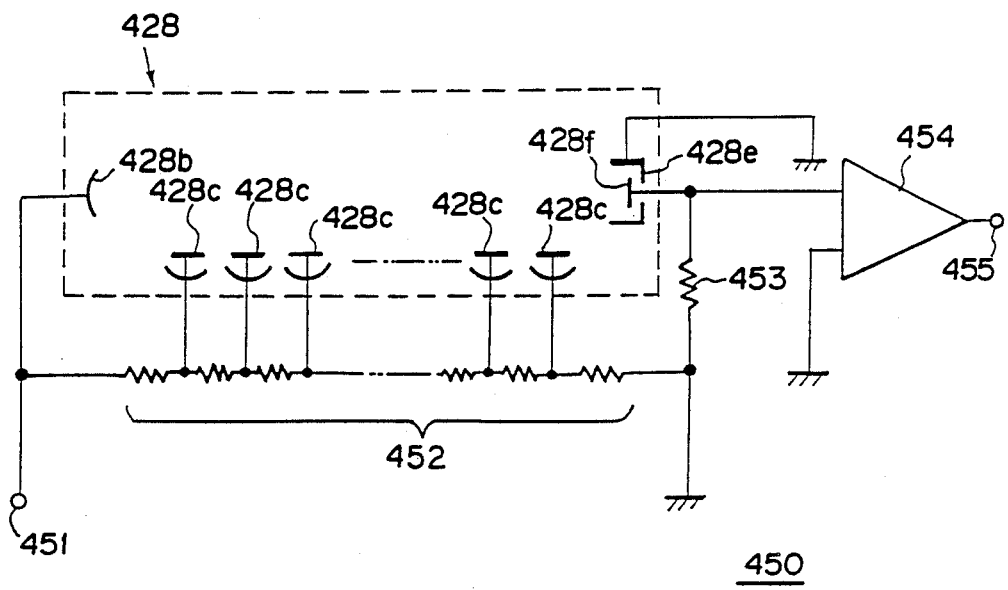
FIG. 17 is a circuit diagram showing the drive circuit for the photomultiplier shown in FIGS. 16A and 16B, FIGS. 18 and 19 are schematic side views showing a further embodiment of the second radiation image recording and read-out apparatus in accordance with the present invention.

FIG. 17 shows an electric circuit 450 for operating the photomultiplier 428 and obtaining a photoelectric output. In FIG. 17, similar elements are numbered with the same reference numerals with respect to FIGS. 16A and 16B. A high negative voltage is applied to the photocathode 428*b* via a high negative voltage applying terminal 451. The high negative voltage applied to the high negative voltage applying terminal 451 is divided by a bleeder resistance group 452 into voltages which are applied respectively to the dynodes 428*c*, 428*c*, . . . The shield electrode 428*e* is grounded, and the anode 428*f* is grounded via a resistor 453 and is connected with one of terminals of an amplifier 454. The other terminal of the amplifier 454 is grounded. The photoelectrically converted image information is obtained as electric signals from an output terminal 455 of the amplifier 454. As the long photomultiplier 428, it is also possible to employ the photomultiplier having the electrode configuration generally referred to as the venetian blind type as described in, for example, Japanese Unexamined Patent Publication No. 62(1987)-16666. Also, the photoelectric read-out means used in the present invention is not limited to the long photomultiplier 428. By way of example, a photoelectric read-out means composed of a photodetector having a comparatively small light receiving face and a light guide member optically coupled with each other as disclosed in, for example, Japanese Unexamined Patent Publication No. 59(1984)-192240 may also be used. However, the long photomultiplier 428 is advantageous since it eliminates the problems with regard to an increase in the apparatus size caused by the use of the large light guide member, a decrease in the light detection efficiency caused by leak of the light emitted by the stimulable phosphor sheet from the light guide member, and an increase in the cost of the apparatus caused by the formation of the light guide member having a complicated shape. Also, in the case where the long photomultiplier 428 is utilized, the light guiding efficiency can be improved by combination with the light guiding reflection mirror 429, combination with an integrating cylinder as disclosed in Japanese Unexamined Patent Publication No. 62(1987)-16668, or combination with the integrating cylinder and the reflection optical element as disclosed in Japanese Patent Application No. 60(1985)156258.

The scanning of the laser beam 421A in the main scanning direction is carried out in the manner as mentioned above and, at the same time, the stimulable phosphor sheet 402 is moved by the nip rollers 408, 408 and the nip rollers 409, 409 in the sub-scanning direction in the manner as mentioned above. Accordingly, the emitted light, i.e. the radiation image, is two-dimensionally read out from the stimulable phosphor sheet 402. In the course of the image read-out from the stimulable phosphor sheet 402, the sheet 402 is moved along the rails 407, 407 shown in FIG. 15. At the time the image read-out is finished, the holding portion 402*a* of the stimulable phosphor sheet 402 is grasped between the nip rollers 409, 409. Therefore, as the nip rollers 409, 409 are rotated reversely, the stimulable phosphor sheet 402 can be fed into the case 403.

After the image read-out is finished in the manner as mentioned above, the nip rollers 409, 409 and the nip rollers 408, 408 are rotated reversely to the direction of rotation at the time of the image read-out, and convey the stimulable phosphor sheet 402 rightward in FIG. 14 into the case 403. As shown in FIG. 12, the erasing section 430 is provided below the stimulable phosphor sheet 402 housed in the case 403. The erasing section 430 is constituted, by way of example, by a surface type erasing light source 431 facing the stimulable phosphor sheet 402 from below. The erasing light source 431 is constituted by, for example, an LED panel or an EL (electroluminescence) plate, and mainly emits the erasing light having a wavelength within the stimulation wavelength range for the stimulable phosphor constituting the stimulable phosphor sheet 402. The erasing light source 431 is turned on at the time the conveyance of the stimulable phosphor sheet 402 into the case 403 is finished. As the stimulable phosphor sheet 402, specifically the stimulable phosphor layer 402B, is exposed to the erasing light, the radiation energy remaining on the stimulable phosphor sheet 402 after the image read-out therefrom has been finished is released therefrom.

In this manner, the stimulable phosphor sheet 402 on which the image (residual image) has been erased to such an extent that the stimulable phosphor sheet 402 becomes reusable for the radiation image recording is housed in the case 403. Therefore, the image recording and the image read-out can be repeated by use of the erased reusable stimulable phosphor sheet 402. As the erasing light source 431, a tungsten-filament lamp, a halogen lamp, an infrared lamp, a xenon flash lamp, a fluorescent lamp or the like as disclosed in U.S. Pat. No. 4,400,619 may be selected as well as the aforesaid surface type light source constituted by the LED panel or the like. In the case where such a lamp is employed as the erasing light source, in order to expose the overall area of the stimulable phosphor sheet 402 standing stationary in the case 403, a plurality of the lamps may be disposed side by side. Alternatively, a rodlike light source may be positioned in the vicinity of the nip rollers 409, 409 therealong for carrying out the erasing while the stimulable phosphor sheet 402 is being returned into the case 403. Also, the erasing light source need not necessarily be secured in the case 403, and may be formed for movement together with the light shielding cover 404.

With the embodiment shown in FIG. 12 wherein the longitudinal and transverse dimensions of the case 403 of the recording and read-out unit 401 are adjusted to be nearly equal to the longitudinal and transverse dimensions of a single image area on the stimulable phosphor sheet 402, the image read-out section 420 and the erasing section 430 are provided inside of the case 403, and the light shielding cover 404 is capable of being housed in the case 403, the size of the recording and read-out unit 401 in the horizontal direction can be reduced to a size nearly equal to the size of the single image area, and the apparatus as a whole can be made compact. Also, the light shielding cover 404 is projected out of the case 403 to hold the stimulable phosphor sheet 402 at the image recording position only at the time of image recording. Therefore, the radiation image can be monitored by use of the fluoroscopic means 440 by the movement of the light shielding cover 404 prior to the image recording, and the timing of the image recording can be adjusted accurately without relying on experience and intuition of the operator. The image recording table 406 may be formed exchangeably so that it can be replaced by a copper plate, a carbon member having low radiation absorptivity or the like when necessary. Also, a grid for absorbing the radiation scattered by the object 5 or bucky device comprising the grid and a means for reciprocal movement of the grid may be releasably provided between the light shielding cover 404 and the object 5. The fluoroscopic section 441 may be moved up to a position in the vicinity of the image recording table 406 as long as the light shielding cover 404 is housed in the case 403.

Figure 20:
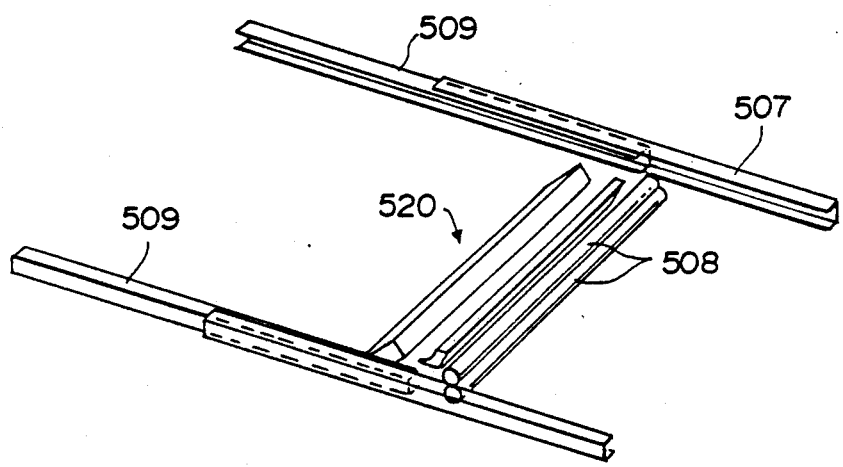
FIG. 20 is a perspective view showing the rails in the embodiment shown in FIGS. 18 and 19.

Another embodiment of the second radiation image recording and read-out apparatus in accordance with the present invention will hereinbelow be described with reference to FIGS. 18, 19 and 20. In this embodiment, an image read-out section 520 and an erasing section 530 provided inside of a case 503 of a recording and read-out unit 501 are similar to the image read-out section 420 and the erasing section 430 in the embodiment shown in FIG. 12, except that the layout of the members of the image read-out section 520 is reverse to the layout in the image read-out section 420.

In this embodiment, the case 503 in which the image read-out section 520 and the erasing section 530 are housed is spaced by a distance approximately equal to the length two times the length of a single image area on a stimulable phosphor sheet 502 from the image recording position below a radiation source 511. At the time the apparatus is to be used, a light shielding cover 504 is pulled up to the position as shown in FIG. 18. A tube-like intermediate case 560 is fitted onto the light shielding cover 504, and the light shielding cover 504 is pulled out of the case 503 together with the intermediate case 560. At the position to which the light shielding cover 504 is pulled together with the intermediate case 560 as shown in FIG. 18, the light shielding cover 504 holds the stimulable phosphor sheet 502 at the position adjacent an image recording table 506. In this condition, fluoroscopic monitoring of the image of the object 5 is carried out by use of a fluoroscopic means 540 provided below the image recording table 506. In the case where it is found by fluoroscopic monitoring that the condition is suitable for the image recording, the light shielding cover 504 is pulled out of the intermediate case 560 up to the position as indicated by the broken line in FIG. 18, and holds the stimulable phosphor sheet 502 at the image recording position. After the radiation is irradiated onto the stimulable phosphor sheet 502 and the image recording is finished, the light shielding cover 504 is immediately returned into the intermediate case 560. Also, as shown in FIG. 19, nip rollers 508, 508 inside of the light shielding cover 504 are rotated to feed the stimulable phosphor sheet 502 leftward. While the stimulable phosphor sheet 502 is thus being conveyed into the case 503, the image read-out from the sheet 502 is carried out by the image read-out section 520. The position of scanning by stimulating rays 521A is adjusted in the vicinity of the position at which the light shielding cover 504 is held by the case 503. The stimulable phosphor sheet 502 is conveyed by being guided by rails 507, 507 inside of the light shielding cover 504 and rails 509, 509 provided at the positions inside of the case 503 on the extensions of the rails 507, 507. In this manner, the overall area of the image forming region on the stimulable phosphor sheet 502 is exposed to the stimulating rays 521A, and the image read-out from the sheet 502 is carried out. At the time the stimulable phosphor sheet 502 is housed in the case 503, the right edge part of the sheet 502 is grasped between the nip rollers 508, 508. In this condition, the overall surface of the stimulable phosphor sheet 502 is exposed to the erasing light produced by a surface type erasing light source 531 provided below the sheet 502. After the erasing is finished, the light shielding cover 504 is inserted into the case 503 together with the intermediate case 560. At this time, the nip rollers 508, 508 are maintained stationary at the position shown in FIG. 19 in the condition grasping the edge part of the stimulable phosphor sheet 502. As shown in FIG. 20, the rails 507, 507 inside of the light shielding cover 504 are larger than the rails 509, 509 inside of the case 503, so that the rails 507, 507 slide on the rails 509, 509 and are housed in the case 503 by lying on the rails 509, 509. In this embodiment, at the time the image recording is carried out, the length of the recording and read-out unit 501 as a whole becomes slightly longer than the length three times the length of a single image area on the stimulable phosphor sheet 502. However, at the time the apparatus is out of use, the length of the recording and read-out unit 501 can be reduced to a length nearly equal to the length of a single image area as in the embodiment shown in FIG. 12. Also, in the embodiment shown in FIG. 18 wherein the intermediate case 560 is provided, the stimulable phosphor sheet 502 need not be conveyed outward from the case 503 at the time of image read-out.

In the embodiments shown in FIGS. 12 and 18, in the case where the substrate of the stimulable phosphor sheet is transparent, irradiation of the stimulating rays and the erasing light can be carried out from above the stimulable phosphor sheet. Also, instead of scanning the stimulating rays in the manner as mentioned above and detecting the light emitted by the stimulable phosphor sheet by use of the photomultiplier, the image read-out section may be constituted for linearly irradiating the stimulating rays to the stimulable phosphor sheet, and the light emitted by the sheet may be detected by a line sensor as disclosed in, for example, Japanese Patent Application No. 62(1987)-21957. Also, in the case where the stimulable phosphor sheet has been stored in the recording and read-out unit without being used for a long period after being subjected to the image (residual image) erasing at the erasing section, the stimulable phosphor sheet stores energy of radiations emitted by radioactive isotopes such as Ra226, which are contained as impurities in the stimulable phosphor, or energy of environmental radiations. These types of radiation energy undesirably stored on the stimulable phosphor sheet cause noise in a radiation image recorded next on the stimulable phosphor sheet. Exactly prior to the image recording, such radiation energy is erased by exposing the stimulable phosphor sheet to the erasing light produced by the erasing light source. Also, in the case where the surface type erasing light source is used, instead of carrying out the image (residual image) erasing immediately after the image read-out from the stimulable phosphor sheet has been finished, the erasing may be carried out exactly prior to the next radiation image recording, thereby to perform the residual image erasing and the secondary erasing by a single erasing step. In this case, the radiation energy as the residual image component remaining on the stimulable phosphor sheet is naturally released to some extent by its decay characteristics, and therefore the amount of the erasing light for the residual image erasing can be decreased.

We claim:

1. A radiation image recording and read-out apparatus which comprises:
   (i) a recording and read-out unit provided with:
      (a) a case for housing therein a stimulable phosphor sheet and having longitudinal and transverse dimensions approximately equal to the longitudinal and transverse dimensions of a single image recording area on said stimulable phosphor sheet, (b) an image recording section for holding said stimulable phosphor sheet in said case, and having a radiation image of an object stored on said stimulable phosphor sheet, (c) an image read-out section provided in said case for exposing said stimulable phosphor sheet carrying said radiation image stored thereon to stimulating rays which cause said stimulable phosphor sheet to emit light in proportion to the stored radiation energy, and photoelectrically detecting the emitted light to obtain image signals, and (d) an erasing section provided in said case for releasing the radiation energy remaining on said stimulable phosphor sheet, for which the detection of said emitted light has been carried out, before the image recording is carried out on said stimulable phosphor sheet, (ii) a unit movement means for moving said recording and read-out unit so that said recording and read-out unit takes a first position at which said stimulable phosphor sheet held at said image recording section is disposed at an image recording position exposed to radiation passing through said object, and a second position retracted from said first position, and (iii) a fluoroscopic means for receiving the radiation passing through said object at the time said recording and read-out unit is present at said second position, and converting the radiation into signals for a visible image.

2. An apparatus as defined in claim 1, wherein said stimulable phosphor sheet is shaped in an endless belt-like form, said stimulable phosphor sheet in the endless belt-like form is held at said image recording section by being applied around two sets of roller sections which are spaced from each other by a distance approximately equal to the length of a single image area, and means for feeding the image-recorded portion of said stimulable phosphor sheet out of said image recording section and feeding a different portion of said stimulable phosphor sheet to said image recording section, and for scanning said stimulable phosphor sheet with stimulating rays in a sub-scanning direction by the movement of said stimulable phosphor sheet, for detection of said light emitted by said stimulable phosphor sheet.

3. An apparatus as defined in claim 1 wherein said stimulable phosphor sheet is formed as a strip-like flexible sheet which is longer than several longitudinal dimensions of a single image recording area, one end and the other end of said stimulable phosphor sheet are respectively wound around a first wind-up shaft and a second wind-up shaft, whereby said stimulable phosphor sheet is applied at the image recording section between said first wind-up shaft and said second wind-up shaft, and means for scanning said stimulable phosphor sheet with stimulating rays in a sub-scanning direction by the wind-up movement of said stimulable phosphor sheet between said first wind-up shaft and said second wind-up shaft, for detection of said light emitted by said stimulable phosphor sheet.

4. An apparatus as defined in claim 1 wherein said stimulable phosphor sheet is secured at said image recording section, said image read-out section and said erasing section are provided on a moveable body for movement along the surface of said stimulable phosphor sheet, and means for scanning said stimulable phosphor sheet with stimulating rays in a sub-scanning direction by the movement of said moveable body, thereby to carry out the detection of said light emitted by said stimulable phosphor sheet, and the image erasing is carried out by the movement of said moveable body.

5. An apparatus as defined in claim 1, wherein an opening through which said stimulable phosphor sheet is to be passed is formed at one end of said case which one end faces an edge of said stimulable phosphor sheet, and means for scanning said stimulable phosphor sheet with stimulating rays in a sub-scanning direction by such movement of said stimulable phosphor sheet that said stimulable phosphor sheet is projected out of said case through said opening from said image recording section, for detection of said light emitted by said stimulable phosphor sheet.

* * * * *